(12) United States Patent
Takeda et al.

(10) Patent No.: US 11,182,311 B2
(45) Date of Patent: Nov. 23, 2021

(54) VIRTUALIZATION SUPPORT DEVICE, CONTROL METHOD OF VIRTUALIZATION SUPPORT DEVICE, AND CALCULATION SYSTEM

(71) Applicants: KABUSHIKI KAISHA TOSHIBA, Minato-ku (JP); Toshiba Electronic Devices & Storage Corporation, Minato-ku (JP)

(72) Inventors: Akira Takeda, Kawasaki (JP); Takeshi Kodaka, Kamakura (JP); Yutaka Yamada, Fuchu (JP)

(73) Assignees: KABUSHIKI KAISHA TOSHIBA, Minato-ku (JP); Toshiba Electronic Devices & Storage Corporation :, Minato-ku (JP)

( * ) Notice: Subject to any disclaimer, the term of this patent is extended or adjusted under 35 U.S.C. 154(b) by 0 days.

(21) Appl. No.: 16/806,113

(22) Filed: Mar. 2, 2020

(65) Prior Publication Data
US 2021/0089478 A1 Mar. 25, 2021

(30) Foreign Application Priority Data
Sep. 24, 2019 (JP) .............................. JP2019-172581

(51) Int. Cl.
*G06F 13/16* (2006.01)
*G06F 12/1009* (2016.01)

(52) U.S. Cl.
CPC ...... *G06F 13/1668* (2013.01); *G06F 12/1009* (2013.01); *G06F 2212/657* (2013.01)

(58) Field of Classification Search
CPC ............ G06F 13/1668; G06F 12/1009; G06F 2212/657
See application file for complete search history.

(56) References Cited

U.S. PATENT DOCUMENTS

| 9,047,090 B2 | 6/2015 | Kottilingal et al. |
| 9,081,612 B2 | 7/2015 | Hattori et al. |
| 2005/0046632 A1* | 3/2005 | Chiu ..................... G06T 15/005 345/501 |

(Continued)

FOREIGN PATENT DOCUMENTS

| JP | 5748349 B2 | 7/2015 |
| JP | 5916955 B2 | 5/2016 |
| JP | 2019-507420 A | 3/2019 |

*Primary Examiner* — Farley Abad
(74) *Attorney, Agent, or Firm* — Oblon, McClelland, Maier & Neustadt, L.L.P.

(57) ABSTRACT

According to one embodiment, a virtualization support device includes: a first processor controlling an operation of accelerators; a memory holding first information regarding a first application executed by a second processor, second information regarding a second application executed by the second processor, one or more first requests from the first application, and one or more second requests from the second application; and a management unit coupled to the first processor and the memory. The first processor performs arbitration of an order in which the accelerators execute the first and second requests, controls setting of the management unit by using the one of first and second information based on the arbitration, and causes the accelerators to execute one of the first and second requests based on the arbitration.

17 Claims, 21 Drawing Sheets

(56) References Cited

U.S. PATENT DOCUMENTS

| | | | |
|---|---|---|---|
| 2009/0106775 A1* | 4/2009 | Cermak | G06F 40/154 |
| | | | 719/318 |
| 2012/0284446 A1* | 11/2012 | Biran | G06F 13/4022 |
| | | | 710/306 |
| 2014/0337855 A1* | 11/2014 | Bass | G06F 9/5044 |
| | | | 718/107 |
| 2015/0089495 A1* | 3/2015 | Persson | G06F 9/45558 |
| | | | 718/1 |
| 2018/0011651 A1* | 1/2018 | Sankaran | G06F 3/0665 |
| 2019/0155634 A1 | 5/2019 | Parker | |

* cited by examiner

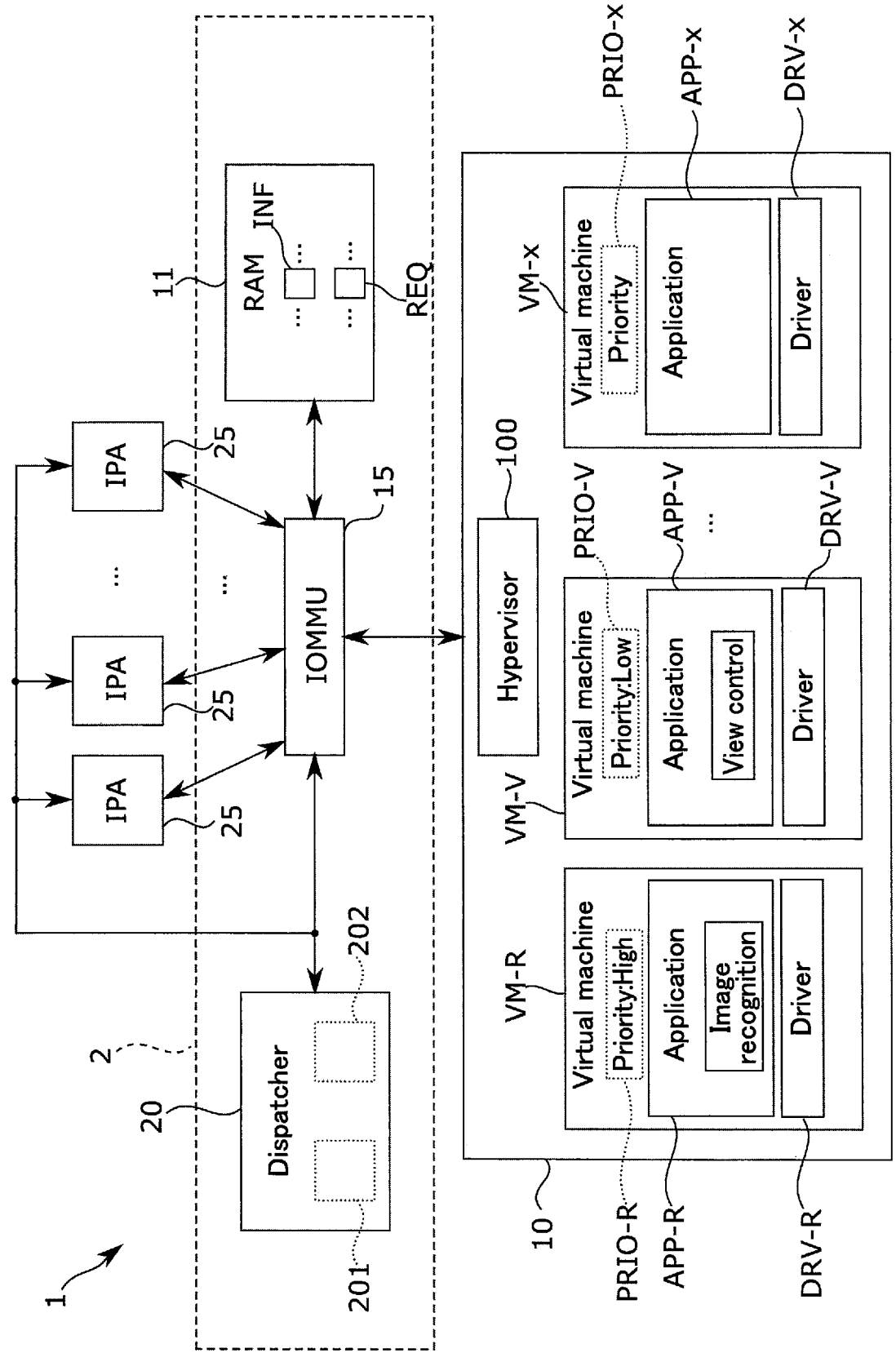
F I G. 2

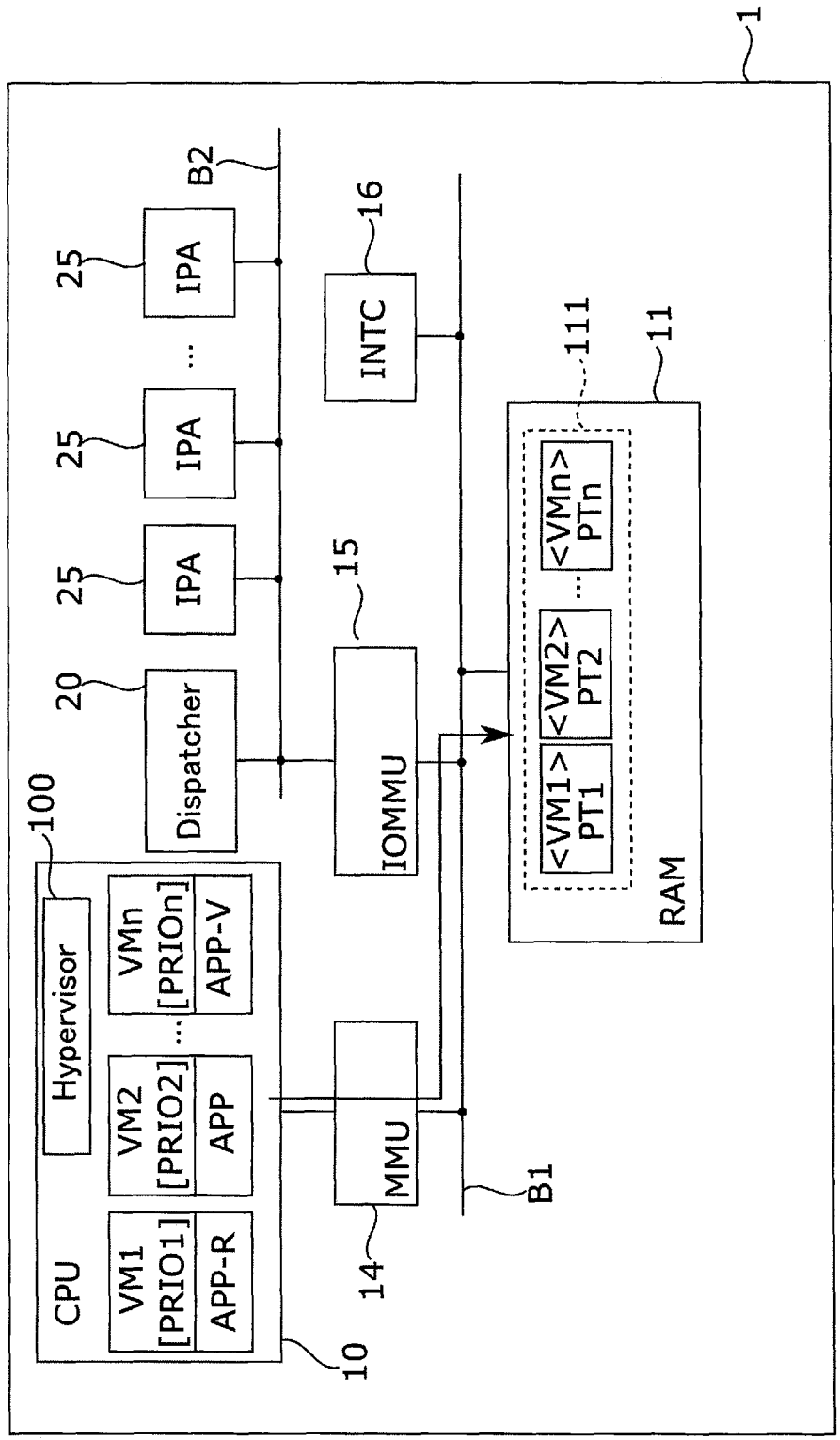
F I G. 6

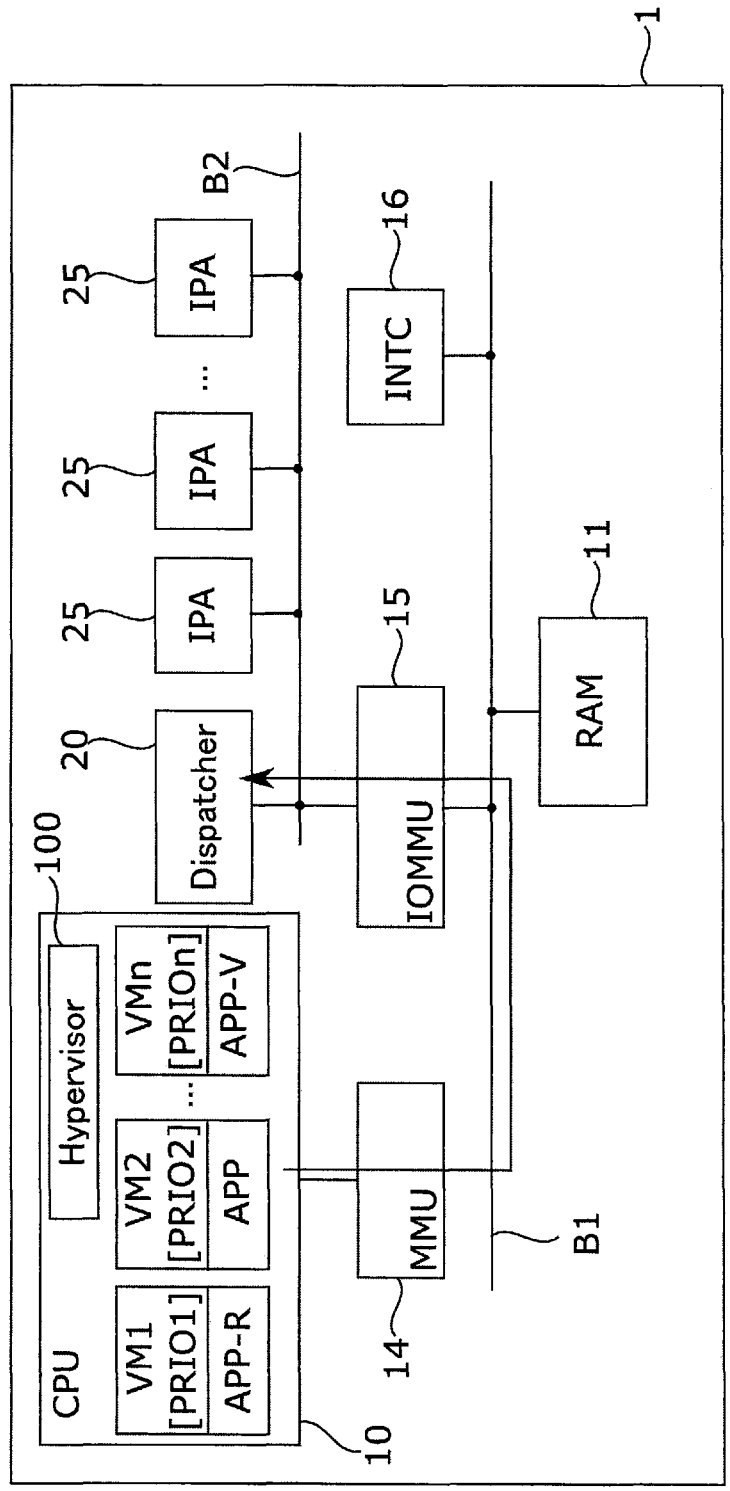
F I G. 8

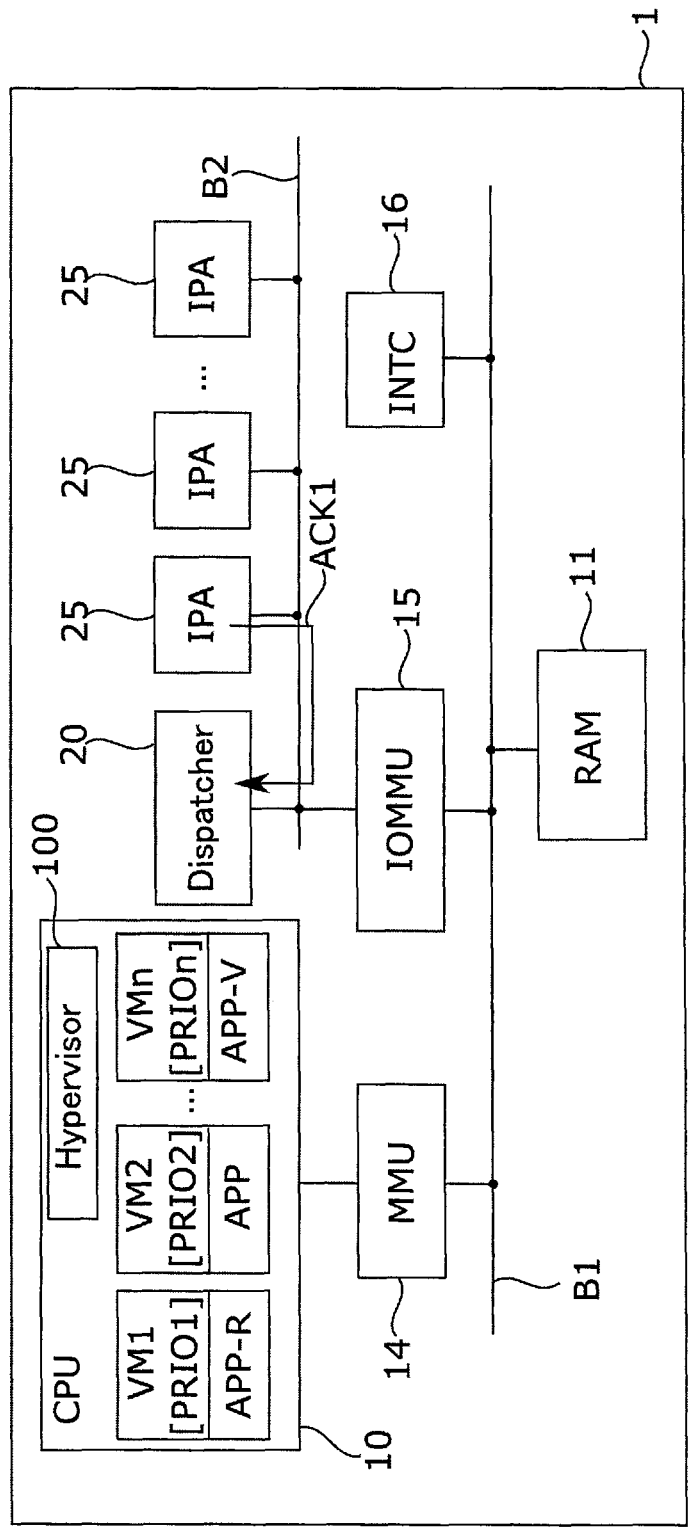
F I G. 13

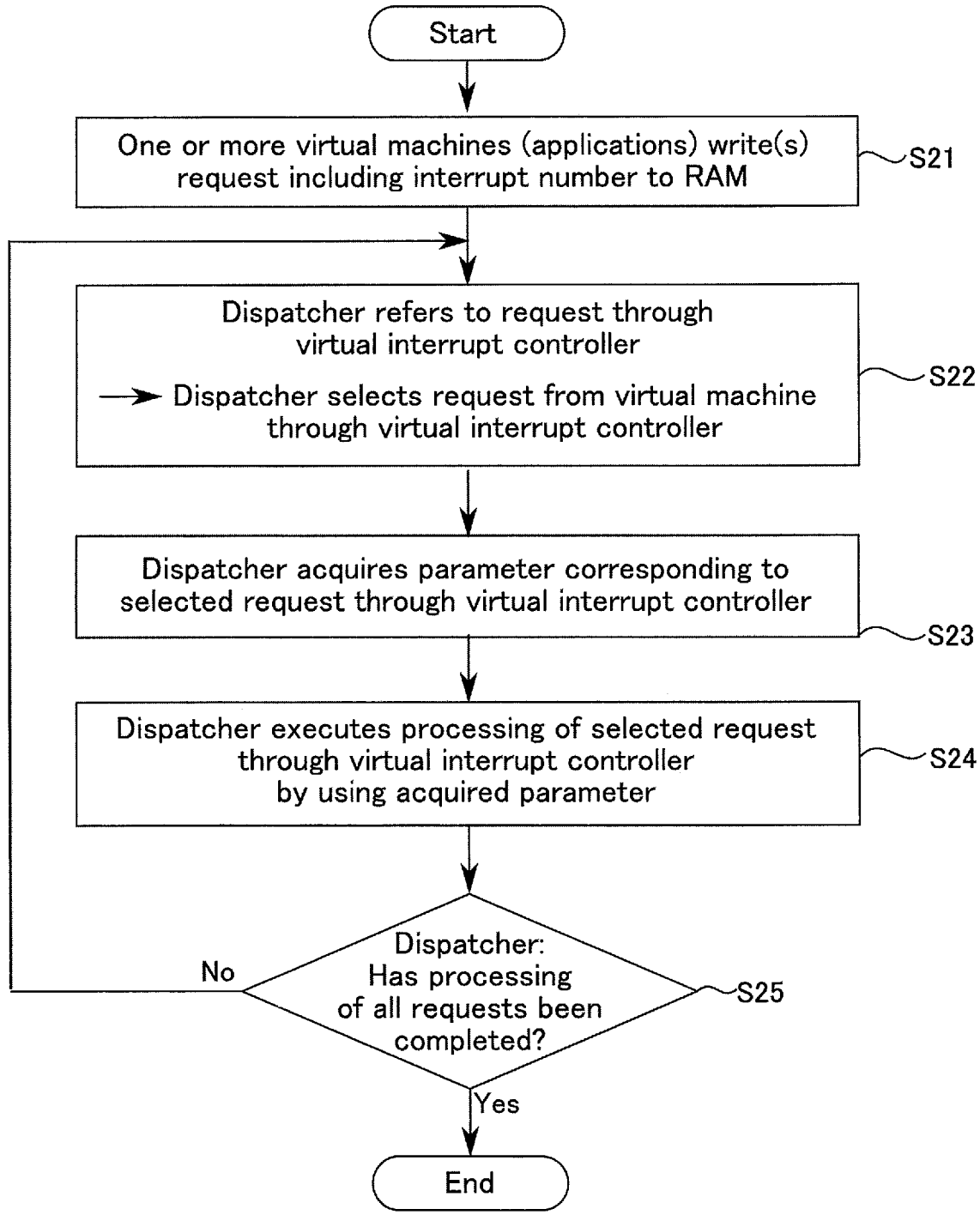
F I G. 17

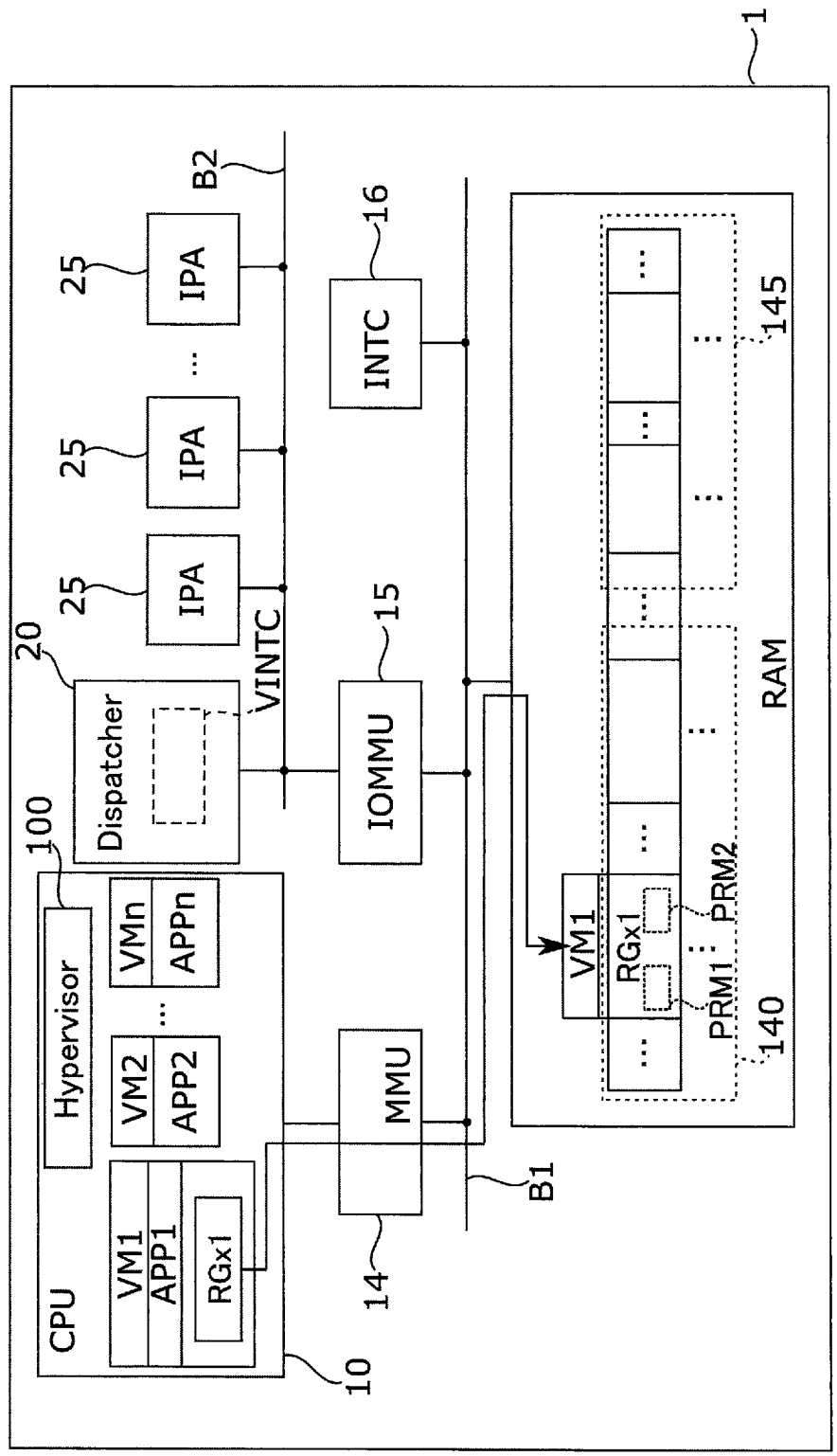
F I G. 18

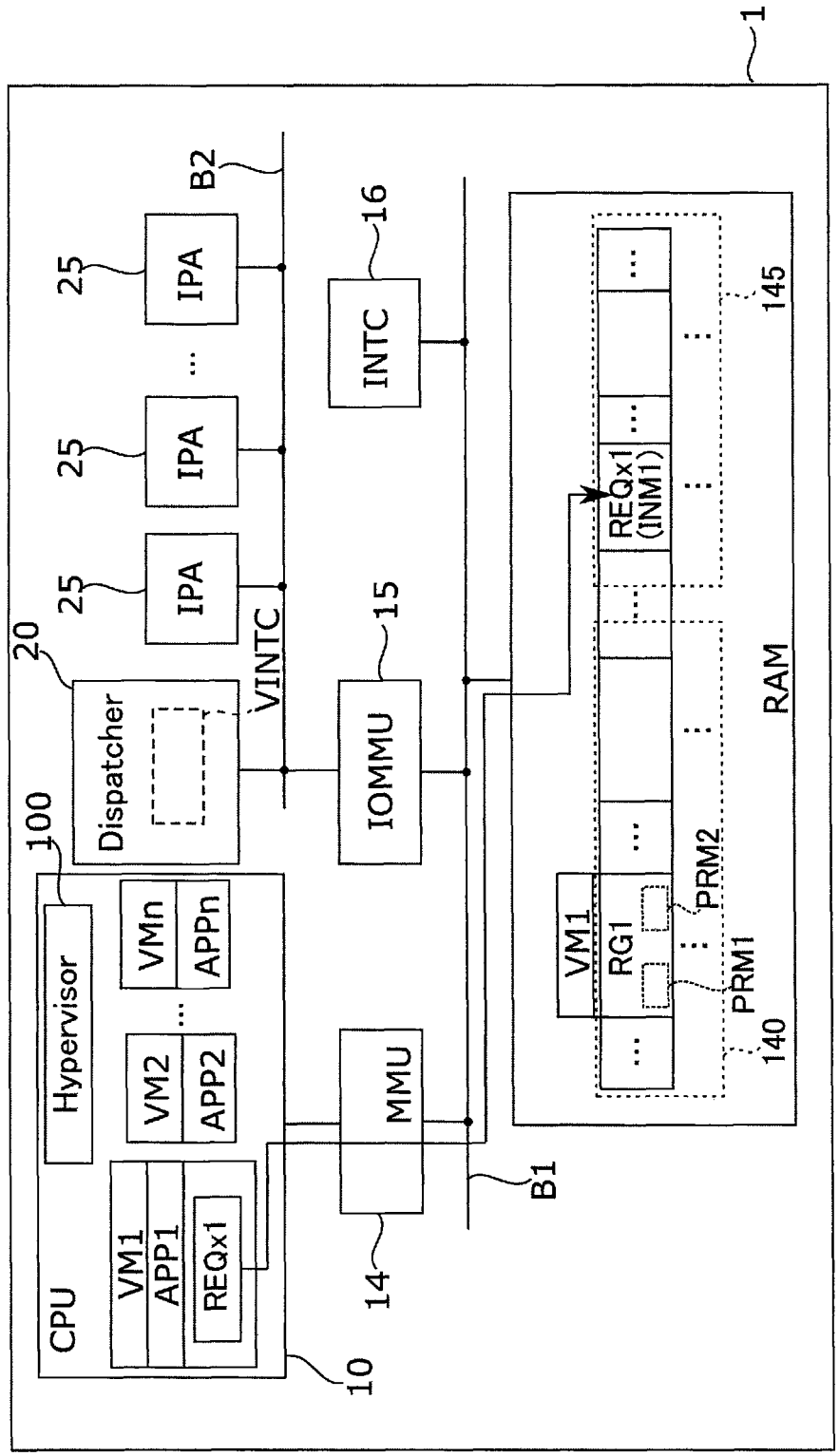
F I G. 19

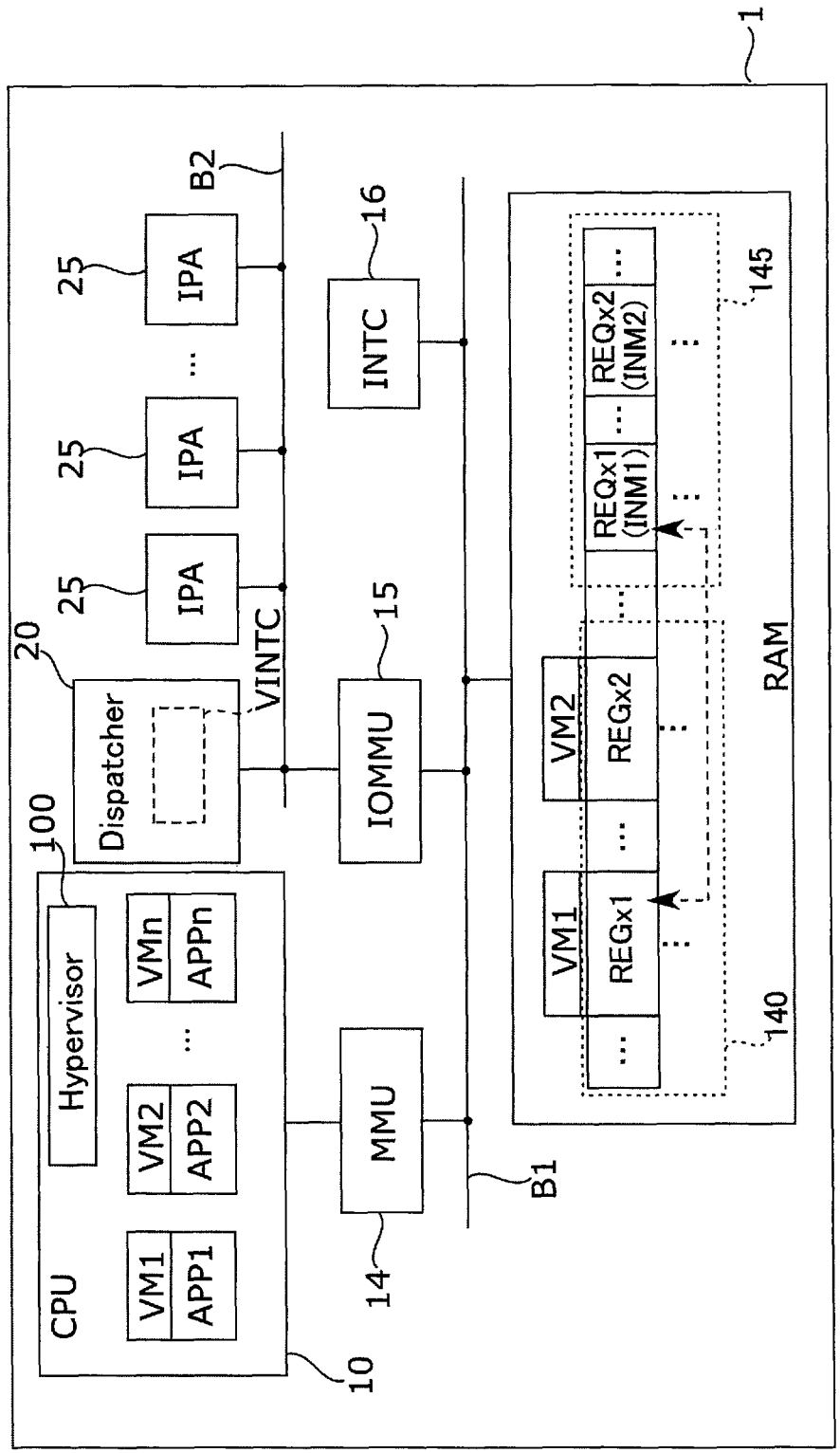
F I G. 20

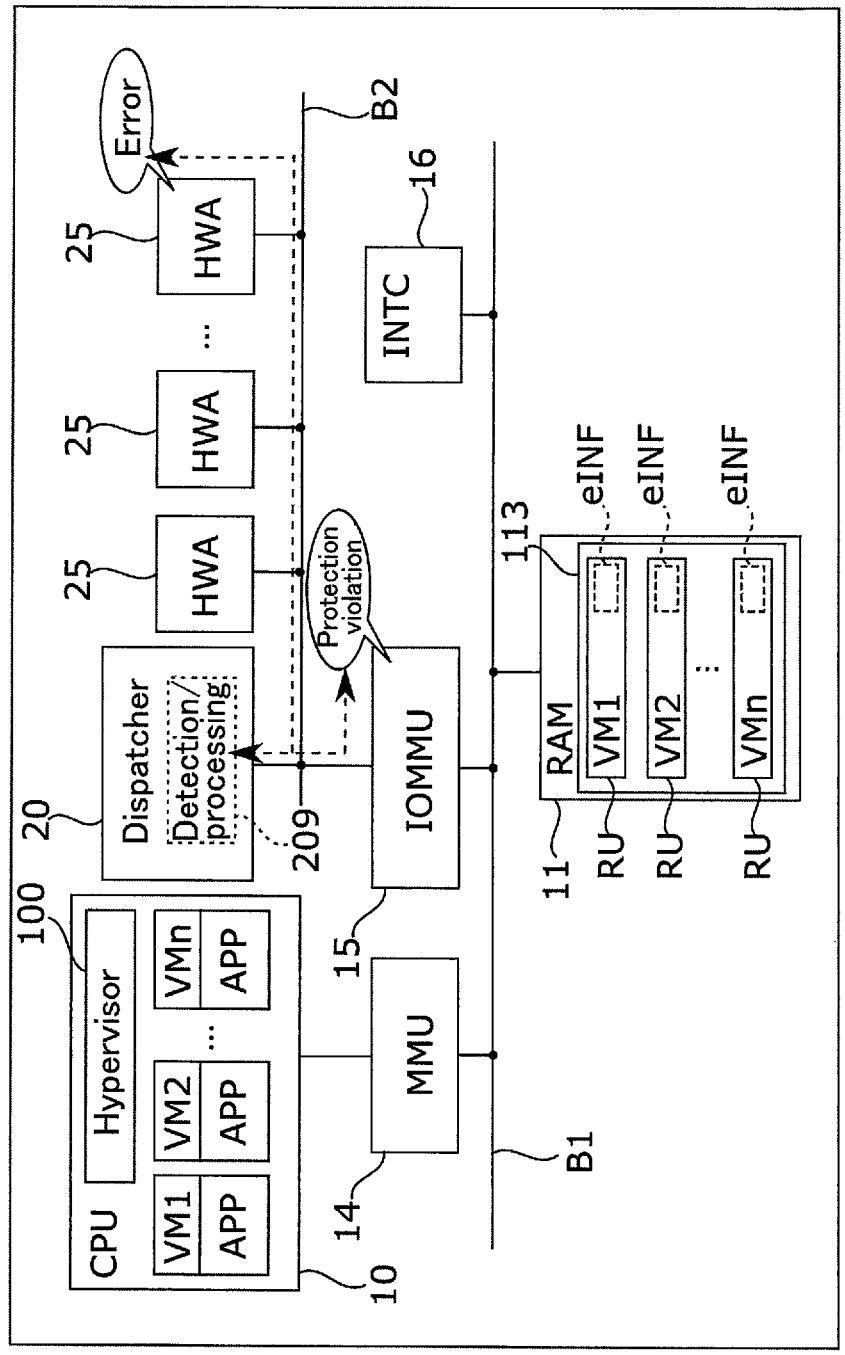
F I G. 21

VIRTUALIZATION SUPPORT DEVICE, CONTROL METHOD OF VIRTUALIZATION SUPPORT DEVICE, AND CALCULATION SYSTEM

CROSS-REFERENCE TO RELATED APPLICATIONS

This application is based upon and claims the benefit of priority from Japanese Patent Application No. 2019-172581, filed Sep. 24, 2019, the entire contents of which are incorporated herein by reference.

FIELD

Embodiments described herein relate generally to a virtualization support device, a control method of a virtualization support device, and a calculation system.

BACKGROUND

A virtualization technology for a plurality of applications that are operated in parallel has been adopted for increased agility of processors.

BRIEF DESCRIPTION OF THE DRAWINGS

FIGS. 2, 3, and 4 are schematic diagrams showing an example of a configuration of a virtualization support device of a first embodiment.

FIGS. 6 to 14 are schematic diagrams for illustrating an example of an operation of the virtualization support device of the first embodiment.

FIG. 17 is a flowchart illustrating an example of an operation of the virtualization support device of the second embodiment.

FIGS. 18 to 20 are schematic diagrams for illustrating an example of an operation of the virtualization support device of the second embodiment.

FIG. 21 is a diagram showing an example of a configuration of a virtualization support device of a third embodiment.

DETAILED DESCRIPTION

Virtualization support devices of multiple embodiments will be described with reference to FIGS. 1 to 21.

Hereinafter, the present embodiments will be described in detail with reference to the accompanying drawings. In the description below, elements having the same functions and configurations will be denoted by the same reference symbols.

Also, in the embodiments described below, when elements (e.g., circuitry, interconnect, various voltages and signals, and the like) are denoted by reference symbols with numbers or alphabetical characters for distinction but need not necessarily be distinguished from each other, such numbers or alphabetical characters may be omitted in the description.

In general, according to one embodiment, a virtualization support device includes: a first processor configured to control an operation of a plurality of hardware accelerators; a memory configured to hold first information regarding a first application executed by a second processor, second information regarding a second application executed by the second processor, one or more first requests from the first application, and one or more second requests from the second application; and an input/output memory management unit coupled to the first processor and the memory. The first processor is configured to: perform arbitration of an order in which the plurality of hardware accelerators execute the first and second requests from the first and second applications; control setting of the input/output memory management unit by using one of the first and second information based on the arbitration; and cause one or more of the plurality of hardware accelerators to execute one of the first and second requests based on the arbitration.

(1) First Embodiment

A virtualization support device of an embodiment will be described with reference to FIGS. 1 to 14.

(a) Configuration Example

An example of a configuration of a virtualization support device of the present embodiment will be described with reference to FIGS. 1 to 5.

Figure 1:
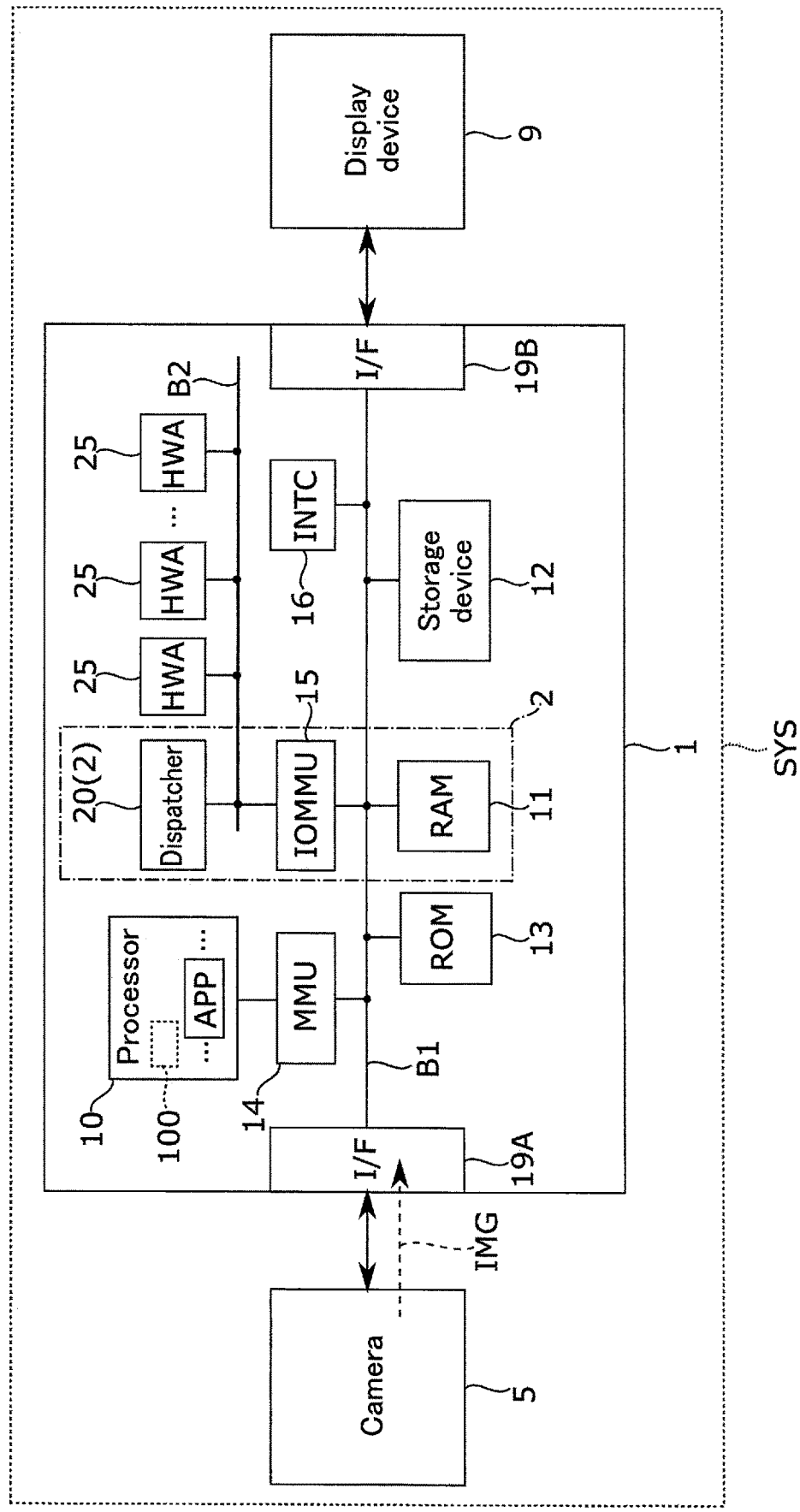
FIG. 1 is a diagram showing an example of a configuration of an image processing device that includes a virtualization support device of an embodiment.

FIG. 1 is a schematic diagram showing an example of a semiconductor device and system including the virtualization support device of the present embodiment.

The semiconductor device 1 includes a processor 10, a memory device 11, a storage device 12, a ROM 13, a memory management unit (MMU) 14, an input/output memory management unit (IOMMU) 15, an interrupt controller 16, interface circuit 19A, 19B, a plurality of hardware accelerators 25, a virtualization support device 2, and the like.

The processor 10 is coupled to a bus B1 in the semiconductor device 1.

The processor 10 uses an application (software) APP and various kinds of information (data) to execute various types of processing (such as calculation processing) for implementing a predetermined operation and function of the device 1. The application APP is provided from, for example, the memory device 11, the storage device 12, the ROM 13, or the like.

Hereinafter, the processor 10 is referred to as a "central processing unit (CPU)".

The memory device 11 is coupled to the bus B1 via a memory controller (not shown). The memory device 11 can temporarily hold information (data) such as various kinds of setting information, various kinds of management information, various tables, data to be processed, and calculation results of the processing executed. The memory device 11 can temporarily hold information provided from another device.

The memory device 11 includes at least one of a dynamic random access memory (DRAM), a static random access memory (SRAM), a NOR-type flash memory, or the like. Hereinafter, the memory device 11 is referred to as a "RAM".

The storage device 12 is coupled to the bus B1. The storage device 12 can hold various kinds of setting information, various kinds of management information, applications (software), and the like. For example, during operation of the semiconductor device 1, a part (or all) of the data in the storage device 12 is loaded into the memory device 11.

The storage device 12 includes at least one of a hard disk drive (HDD), a solid state drive (SSD), a NAND flash memory, or the like.

The ROM 13 is coupled to the bus B1. The ROM 13 stores a basic input/output system (BIOS) of the device 1, firmware, and the like.

The interrupt controller 16 is coupled to the bus B1. The interrupt controller 16 can control interrupt processing that has occurred when a plurality of applications APP are executed. The interrupt controller 16 outputs a signal giving notice of interruption of processing (hereinafter, the signal is referred to as an "interruption notice") when a device requests execution of processing which is different from processing currently being executed.

The MMU 14 is coupled between the CPU 10 and the bus B1. The MMU 14 manages and controls transfer of information between the CPU 10 and the RAM 11.

The MMU 14 generates mapping of a virtual address (logical address) and a physical address between the CPU 10 and the memory device 11. Thereby, access (e.g., data transfer) between the CPU 10 and the RAM 11 is possible.

The IOMMU 15 is coupled to the bus B1. The IOMMU 15 is coupled to a virtualization support device 20 and a plurality of accelerators 25 via a bus B2.

The IOMMU 15 manages and controls transfer of information between the RAM 11 and the accelerators 25.

The IOMMU 15 generates mapping (e.g., a transform table) of a virtual address and a physical address between the RAM 11 and the accelerators 25. The IOMMU 15 generates mapping of a virtual address and a physical address between the virtualization support device 20 and the RAM 11. Thereby, access between the RAM 11 and the accelerators 25 and access between the virtualization support device 20 and the RAM 11 are both possible.

The accelerator (hereinafter also referred to as a "hardware accelerator") 25 is hardware (processor) that supports processing of the application APP executed by the CPU 10 to accelerate the processing by the CPU 10. For example, the accelerator 25 is associated with the application APP according to the processing to be executed.

The interface circuit 19A, 19B allow for communication between the semiconductor device 1 and other devices.

The CPU 10, RAM 11, storage device 12, interrupt controller 16, interface circuit 19A, 19B, and accelerators 25 are virtualized by the virtualization support device 20 and a hypervisor 100 that operates on the CPU 10. At least one application APP operates on the virtualized device (hereinafter referred to as a "virtual machine VM").

The virtualization support device 20 of the present embodiment includes at least the processor 20. The processor 20 is a hardware accelerator. The virtualization support device 2 supports virtualization of the accelerator 25 in place of the hypervisor that operates on the CPU 10. For example, when a plurality of applications APP are being processed in parallel, the virtualization support device 20 controls (arbitrates) the order of execution of the processing requested by the plurality of applications at the accelerator 25.

In the present embodiment, the virtualization support device 20 allows for reduction of the load on the CPU 10.

The semiconductor device 1 is, for example, a system LSI. The semiconductor device 1 is provided and mounted in a system SYS. For example, the semiconductor device 1 of the present embodiment is an image processing device (also referred to as an "image recognition device"). The image processing device 1 is used for the image recognition system SYS.

The image recognition system SYS includes, for example, a camera 5 and a display device 9 in addition to the image processing device 1.

The camera 5 is electrically coupled to the image processing device 1 with or without wires. The camera 5 is coupled to the interface circuit 19A in the image processing device 1. For example, the camera 5 includes a CMOS image sensor (or a CCD image sensor). The camera 5 may include an infrared sensor and the like.

The camera 5 acquires data IMG corresponding to an image in a certain space (hereinafter the data IMG is referred to as "image data"). The image data IMG acquired is sent to the image processing device 1. An image recognition process is performed on the image data IMG by the plurality of applications APP executed by the CPU 10. Thereby, an object (target object) included in the image data IMG is recognized and identified.

The display device 9 is electrically coupled to the image processing device 1 with or without wires. The display device 9 is coupled to the interface circuit 19B of the image processing device 1. For example, the display device 9 is a liquid crystal display or an organic EL display.

The display device 9 displays results of the processing executed by the image processing device 1. The display device 9 may function as a user interface (e.g., a touch panel) of the image processing device 1.

The camera 5 and the display device 9 are controlled by the application APP executed by the CPU 10. The camera 5 and the display device 9 may be components of the image processing device 1.

When the device 1 is an image processing device, at least one of the accelerators 25 is, for example, an image processing accelerator (hereinafter also referred to as an "IPA"). The IPA 25 can execute various types of processing on image data such as extraction processing with respect to feature amounts, various types of image transform processing, various types of inter-image calculation processing, and various types of calculation processing or support of said processing. For example, the IPA 25 can perform, on image data, at least one of multiple pieces of image processing such as a histogram process, a binarization process, YUV color processing, matching processing, and inter-image arithmetic processing.

The image processing device 1 and the image recognition system SYS of the present embodiment may be applied to vehicles, in-vehicle cameras, surveillance cameras, smartphones, futuristic phones, mobile terminals, unmanned aerial vehicles, and the like.

The application APP may be provided from a device outside the device 1 (such as a server or a host device) or a storage medium (such as a memory card, a USB memory, or an optical disk). A whole or part of the applications APP may be provided from a device/storage medium outside the device 1 (or system SYS) to the device 1 with or without wires, and executed in the device 1.

A plurality of applications APP are executed in the image recognition system SYS. When executing the processing, the image processing device 1 is virtualized by the virtualization support device 2 and the hypervisor that operates on the CPU 10. The virtualized image processing device 1 controls execution of each application APP as a virtual machine VM.

FIG. 2 schematically shows a concept of the virtualized image processing device of the present embodiment that executes the applications.

As shown in FIG. 2, each of the applications APP (APP-R, APP-V, APP-n) operates on the virtual machines VM (VM-R, VM-V, VM-n).

In the respective virtual machines VM, the applications APP execute predetermined processing through drivers (device drivers) DRV (DRV-R, DRV-V, DRV-n) corresponding thereto. The drivers DRV, for example, control the applications, write a parameter to a predetermined memory area (such as RAM 11 or a register), and read a parameter/setting information from the predetermined memory area. For example, the drivers DRV are programs in the applications APP or the OS.

The hypervisor 100 can execute and control the plurality of applications APP. Also, the hypervisor 100 can control the RAM 11, storage device 12, MMU 16, IOMMU 15, camera, display device, and the like.

For example, the RAM 11 holds information (such as setting information and parameters) INF related to each of the virtual machines VM and a request REQ (for processing) from each of the virtual machines VM.

When interrupt processing occurs due to a request from the virtual machines VM or an instruction from the interrupt controller 16, the applications APP to be executed are switched. In accordance with the request and the interrupt processing, the IPA 25 associated with the application APP to be executed is controlled.

For example, the image processing device 1 executes, in parallel, an application APP-R for recognition processing for image data (hereinafter said application is referred to as a "recognition application"), a view control application (hereinafter referred to as a "view application") APP-V, any application APP-n for various types of calculation processing and control processing, and the like.

The recognition application APP-R is software (program) for executing various types of image processing such as detecting a predetermined object (such as a car, a person, a face, or a character) from image data, calculating feature amounts (such as a luminance gradient) related to the detected object, analyzing the acquired feature amounts, and various types of processing/control based on the results of the analysis.

The view application APP-V is software for controlling a view (e.g., display for a user), such as display of the results of the processing of the device 1 and display of the control of the display device 9.

The above applications APP use one or more IPA 25 according to the processing to be executed.

In a device/system where a plurality of virtual machines VM can be operated, a plurality of applications APP differing in the reliability of the processing required may be executed in parallel.

For example, the recognition application APP-R is processed in parallel with the view application APP-V. The reliability required of the processing of the recognition application APP-R is higher than that required of the processing of the view application APP-V.

In the present embodiment, the virtualization support device 20 arbitrates the execution order of the accelerators 25 in the processing that the applications APP have requested the accelerator 25 to execute. In the present embodiment, the virtualization support device 20 is referred to as a "dispatcher".

The dispatcher 20 is a hardware accelerator (processor). For example, the dispatcher 20 includes processing circuit 201, register circuit 202, and the like.

The processing circuit (e.g., a sequencer) 201 performs various types of calculation processing, control, and the like of the dispatcher 20. The register circuit 202 temporarily holds various types of information (data) provided to the dispatcher 20. The function/configuration of the dispatcher 20 may be virtualized.

A configuration (device) that includes the dispatcher 20 and the IOMMU 15 may be regarded as the virtualization support device 2 of the present embodiment. The virtualization support device 2 may include the accelerator 25.

The dispatcher 20 controls arbitration and switching of the order of execution of a plurality of applications APP based on an index (hereinafter referred to as a "priority" or "priority degree") PRIO set according to the reliability of the processing required.

The priority PRIO is set to the respective applications APP in advance, for example, when mounting the applications APP in the device 1, according to the reliability required of the processing of the applications APP (and the results of the processing).

A priority PRIO-R of the recognition application APP-R is set to a relatively high value. As an example, the priority of the recognition application APP-R is set to the highest value among the plurality of applications APP (APP-R, APP-V, APP-x) used in the image processing device 1.

The priority PRIO-V of the view application APP-V is set to a value lower than that of the priority PRIO-R of the recognition application APP-R.

For example, when a plurality of applications APP are processed in parallel, the dispatcher 20 arbitrates the order of execution of the processing requested by the applications APP at the IPA 25 and switches the processing based on the priority PRIO, so that the processing of the recognition application APP-R (virtual machine VM-R) is prioritized over the processing of the view application APP-V (virtual machine VM-V).

According to the application APP to be executed, the dispatcher 20 acquires various parameters and various kinds of information used for the application APP from the RAM 11 via the IOMMU 15.

The dispatcher 20 causes the IPA 25 associated with the application APP to be executed in order to execute the processing using the acquired parameters and information.

The application APP (virtual machine VM) executes predetermined processing using the results of the processing of the IPA 25.

As described above, in the present embodiment, the dispatcher 20 controls a plurality of IPA 25 in place of the CPU 10.

Therefore, according to the present embodiment, the load on the CPU 10 for virtualization of the accelerators is reduced.

Accordingly, the virtualization support device of the present embodiment can improve the usability of the processor in the system.

(b) Configuration Example of Dispatcher

An example of a configuration of the dispatcher of the virtualization support device of the present embodiment will be described with reference to FIGS. 3 and 4.

As described above, the dispatcher 20 of the present embodiment is provided as a hardware accelerator in the image processing device 1. A part of the configuration and the function of the dispatcher 20 is virtualized by the IOMMU 15 (and MMU 16).

The dispatcher 20 uses information on the plurality of virtual machines VM in the RAM 11 to arbitrate the order of the processing executed by the plurality of accelerators 25 and control an operation/processing.

<Information Inside RAM>

Figure 3:
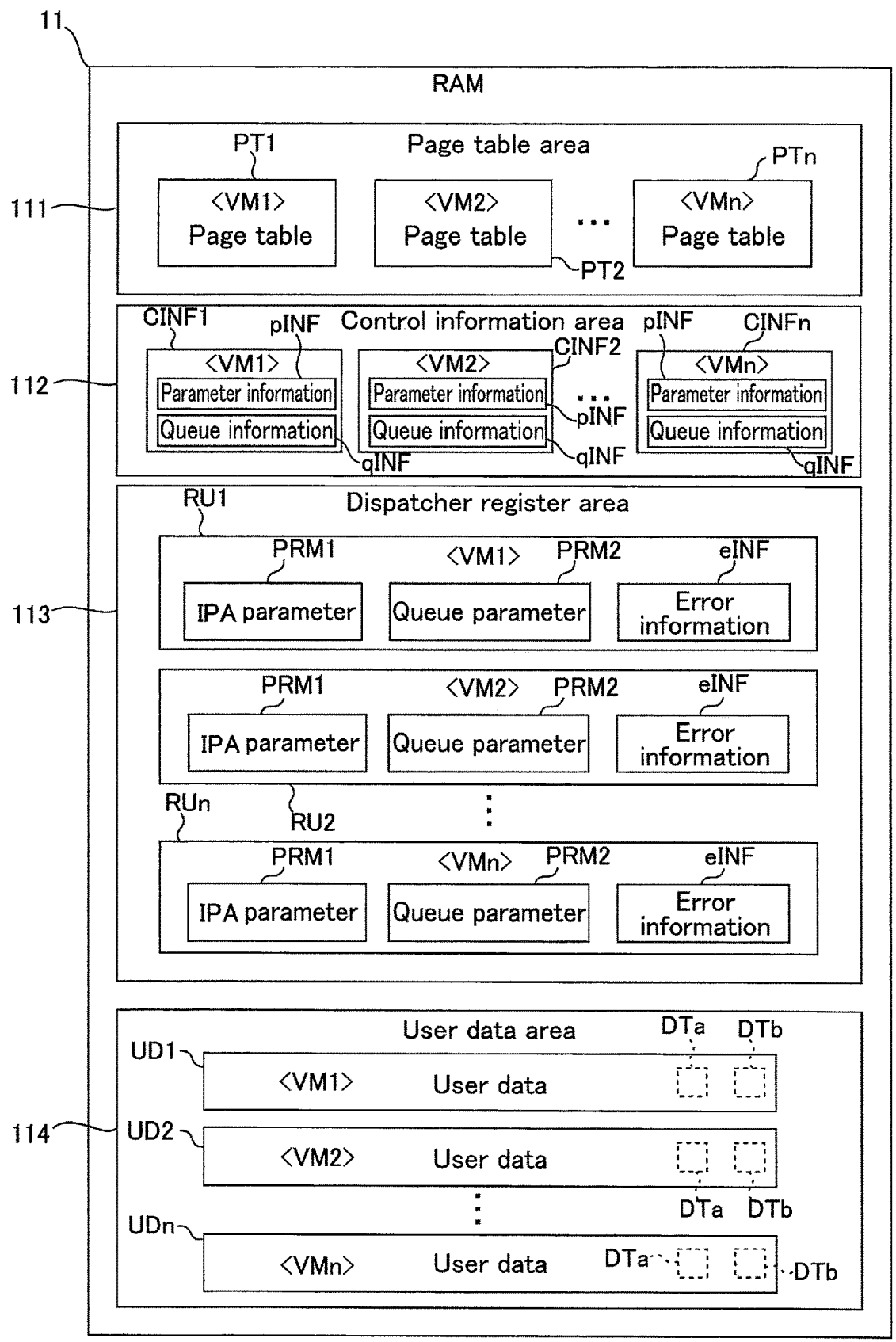

FIG. 3 is a schematic diagram showing an example of a configuration of the memory area in the RAM according to the present embodiment.

The RAM 11 includes a plurality of memory areas 111, 112, 113, and 114 set for virtualization of the components of the image processing device 1.

As shown in FIG. 3, a page table area 111 and a control information area 112 are provided in the RAM 11. For example, information (data) related to control and management of the system SYS/device 1 is stored in the page table area 111 and the control information area 112.

The page table area 111 holds a page table PT (PT1, PT2, PTn) for each of the virtual machines VM (VM1, VM2, VMn).

The page table PT is a table showing a correspondence relationship between a physical address and a virtual address (logical address) of a memory space in the RAM 11 used by the respective virtual machines VM. The virtual address and the physical address of the memory space are transformed based on the page table PT.

The control information area 112 holds control information CINF (CINF1, CINF2, CINFn) of each virtual machine VM.

The control information CINF includes IPA parameter information pINF and queue information qINF. The IPA parameter information pINF is information related to various setting IPA parameters and various setting conditions of each virtual machine VM. For example, the IPA parameter information pINF includes information such as the size of image data (or data sampled from image data) that is to be processed. The queue information qINF is information related to the setting and control of a queue of each virtual machine VM.

The dispatcher 20 can access data in the page table area 111 and the control information area 112. The virtual machine VM and the IPA 25 cannot access data in the page table area 111 and the control information area 112.

A dispatcher register area 113 is provided in the RAM 11.

The dispatcher register area 113 holds various kinds of information for each virtual machine VM.

An IPA parameter PRM1, a queue parameter PRM2, an error handling information eINF, and the like are stored in register units RU (RU1, RU2, RU3) corresponding to the respective virtual machines VM.

The IPA parameter PRM1 refers to various types of setting parameters of the IPA 25 associated with each virtual machine VM.

The queue parameter PRM2 refers to a parameter indicating the setting of a queue associated with each virtual machine VM.

The error handling information eINF refers to information indicating various types of setting for the case where an error occurs in each virtual machine. For example, a determination is made as to whether or not processing containing an error is to be prioritized (whether processing that had an error is to be repeated or another processing is to be executed) based on the error handling information eINF, and the error is recorded.

Using the information PRM1, PRM2, and eINF in the dispatcher register area 113, the dispatcher 20 controls the processing (and operation) of the corresponding virtual machine VM and IPA 25. The dispatcher 20 can communicate with the virtual machines VM via the dispatcher register area 113 in the RAM 11.

The dispatcher 20 can access data in the dispatcher register area 113. In regard to the respective virtual machines VM, a virtual machine VM associated with the parameters PRM and information eINF can access its corresponding register unit RU, and cannot access a register unit RU of another virtual machine VM. For example, the virtual machine VM1 can use the data PRM1, PRM2, and eINF in the register unit RU1 associated with the virtual machine VM1. However, the virtual machine VM1 cannot use the data in the register units RU2, RUn not associated with the virtual machine VM1 (i.e., register units associated with other virtual machines VM2, VMn).

The IPA 25 cannot access data in the dispatcher register area 113.

Also, a user data area 114 is provided in the RAM 11.

The user data area 114 holds user data UD (UD1, UD2, UDn) for each virtual machine VM. The user data UD includes, for example, an interrupt flag DTa and various kinds of information DTb related to image data (such as the size of image data).

A virtual machine VM and/or IPA 25 associated with the user data UD can access the data UD in the user data area 114, and other virtual machines VM and/or IPA 25 cannot access the data UD in the user data area 114. For example, the virtual machine VM1 and the IPA 25 that supports the virtual machines VM1 can use user data UD1 associated therewith. However, the virtual machine VM1 cannot use the user data UD2, UDn which is not associated with the virtual machine VM1 (i.e., the user data of other virtual machines VM2, VMn).

In the virtualization support device (image processing device or image recognition system) of the present embodiment, the dispatcher 20 controls the processing of the IPA 25 by using various types of data (tables, parameters, and information) related to each virtual machine VM in the RAM 11.

Thereby, the dispatcher 20 can perform, asynchronously with the CPU 10, autonomous processing (e.g., arbitration of the order in which the plurality of IPA 25 execute requests from the plurality of applications APP (virtual machines VM)).

<Example of Structure of Queue and Priority of Virtual Machine>

An example of a configuration of a queue used for the dispatcher of the virtualization support device of the present embodiment will be described with reference to FIG. 4.

Figure 4:
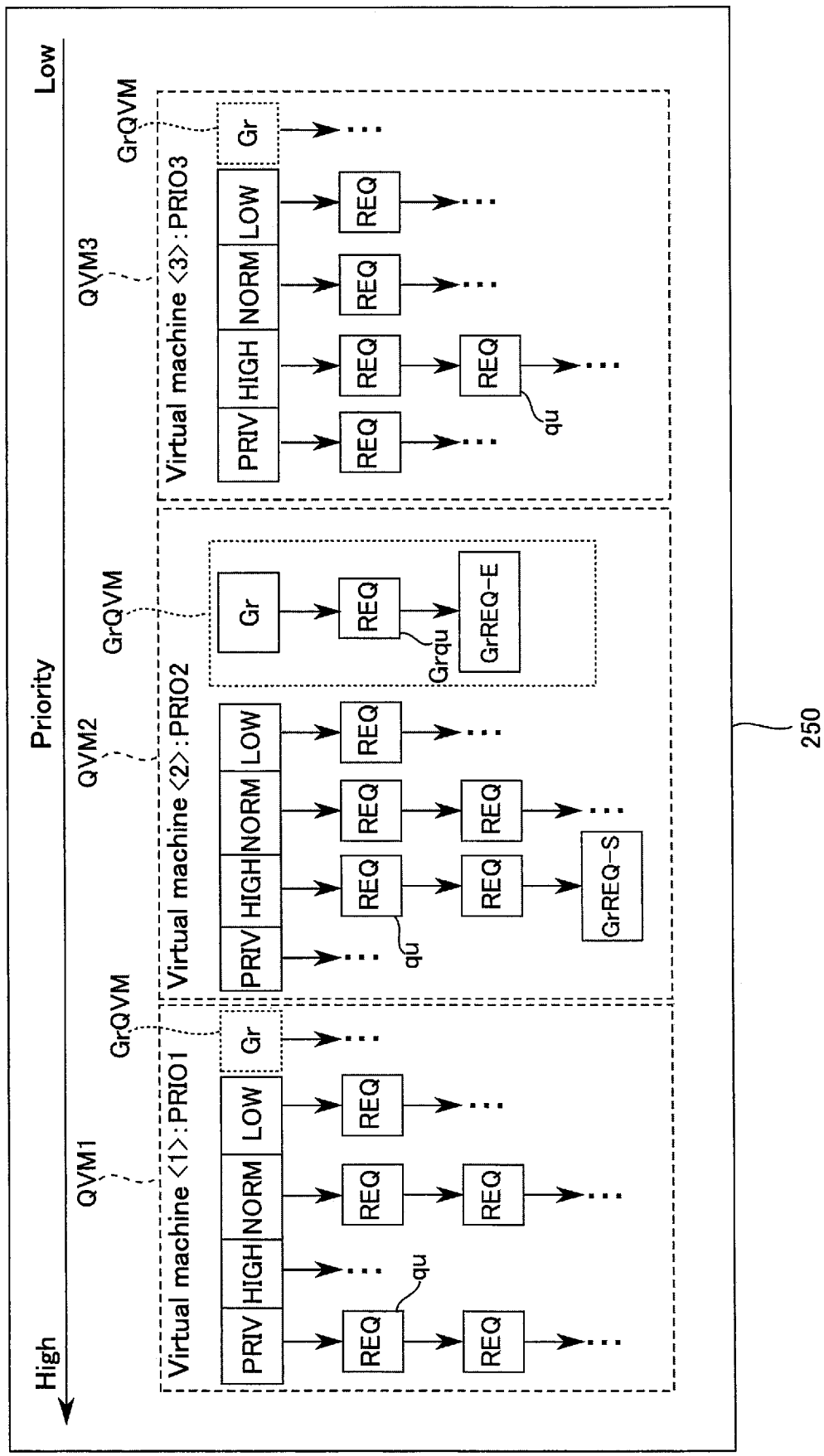

FIG. 4 schematically shows a structure of a queue of the dispatcher 20 according to the present embodiment.

Each virtual machine VM (application APP) issues a request REQ when the processing that should be executed by the virtual machine VM itself occurs. The request REQ issued is provided to a queue circuit 250.

The dispatcher 20 holds independent queues QVM (QVM1, QVM2, QVM3) for the respective virtual machines VM. The requests REQ from the virtual machines VM are stored in the queues QVM corresponding thereto.

The queues QVM may be provided in the RAM 11 or in the register circuit 202 in the dispatcher 20.

For example, the input-output processing of the request is controlled by the FIFO (first-in first-out) method in the queue circuit 250. Each of the queues QVM includes a plurality of queue units qu. One queue unit qu can store one request (processing) REQ. For example, the queue circuit 250 is queue circuit with a priority.

Also, one queue unit qu can store a group start request GrREQ-S.

Each virtual machine VM can have a group queue GrQVM separately from the queue QVM associated therewith. The group queue GrQVM includes a plurality of queue units Grqu. One queue unit Grqu can store one request REQ. Also, the queue unit Grqu can store a group end request GrREQ-E.

In the present embodiment, the number of virtual machines VM (applications APP) is, for example, three. However, the number of virtual machines VM may be two, or four or more.

Each of the three virtual machines VM1, VM2, and VM3 has a priority PRIO (PRIO1, PRIO2, PRIO3) set in advance.

For example, the priority PRIO is set based on the reliability required of the processing of the virtual machines VM (applications APP). As an example, a priority of the virtual machine corresponding to the recognition application APP-R is set to a relatively high value. A priority of the virtual machine corresponding to the view application APP-V (e.g., virtual machine VM3) is set to a value lower than that of the priority of the virtual machine corresponding to the recognition application APP-R (e.g., virtual machine VM1).

In the present embodiment, the first virtual machine VM1, for example, among the three virtual machines VM1, VM2, and VM3 has the highest priority PRIO1.

The second virtual machine VM2 has the second highest priority PRIO2. For example, the virtual machine VM2 has the group queue GrQVM.

The third virtual machine VM3 has the lowest priority PRIO3.

The dispatcher 20 can recognize the priority PRIO set in the virtual machines VM.

Requests to the IPA 25 that correspond to the processing to be executed by the virtual machines VM are stored as requests REQ in the queues QVM corresponding to the respective virtual machines VM.

Each of the requests (processing) REQ has a priority (PRIV, HIGH, NORM, LOW, Gr) of the processing set in advance. The priorities set to the requests REQ are referred to as "priority levels" for distinction.

The requests REQ are allocated to the corresponding queue units qu according to the priority level of the processing in the queues QVM of the virtual machines VM. When the priority level Gr of a group is specified to a request, the request REQ for which the priority level Gr has been specified are inserted to the corresponding queue units Grqu in the group queues GrQVM of the virtual machines VM.

In a selected virtual machine VM, the plurality of requests REQ in the queue QVM are executed in descending order from a request REQ having a high priority level to a request REQ having a low priority level.

The requests REQ having the highest priority level (PRIV) (hereinafter said requests are also indicated as "REQ-PRIV") are executed earlier than the requests REQ having other priority levels.

The requests REQ having the second highest priority level (High) (hereinafter said requests are also indicated as "REQ-HIGH") are executed after all the requests REQ-PRIV having the highest priority level are executed and before the requests REQ having a priority level lower than the second highest priority level are executed.

The requests REQ having the third highest priority level (NORM) (hereinafter said requests are also indicated as "REQ-NORM") are executed after all the requests REQ-HIGH having the second highest priority level are completed and before the requests REQ having the lowest priority level are executed.

The requests REQ having the lowest priority level (LOW) (hereinafter said requests are also indicated as "REQ-LOW") among the plurality of priority levels are executed after all the other requests REQ having a high priority level are completed.

Usually, the request REQ stored in the group queue GrQVM is not executed. However, when the group start request GrSREQ is executed, the request REQ stored in the group queue GrQVM is executed immediately after the group start request GrSREQ is executed, and before the request REQ stored in the queue QVM of the virtual machine VM having a priority equal to or less than the priority PRIO corresponding to the group queue GrQVM is executed. After the group end request GrREQ-E is executed, the request REQ stored in the group queue GrQVW is not executed until another group start request GrSREQ is executed.

As described above, the dispatcher 20 dispatches the plurality of IPA 25 processings requested by the virtual machines/applications in the order of the priority of the virtual machines VM. In the virtual machines VM selected based on the priority PRIO, the processing (request REQ) of each virtual machine VM is executed according to the priority level of the processing.

However, after the group start request GrREQ-S is executed, the execution of the request corresponding to the priority level of the selected virtual machine VM and the virtual machine having a priority lower than that of the selected virtual machine VM is invalid until the group end request GrREQ-E is executed. Instead, one or more requests REQ in the group queue GrQVM is executed until the group end request GrREQ-E is executed.

In this manner, the group queue GrQVM is used for a virtual machine to occupy the IPA 25 for a certain period. The occupation of the IPA 25 by said virtual machine does not affect the dispatch of other virtual machines having a priority higher than that of said virtual machine.

In the example shown in FIG. 4, the request to be processed is selected by the dispatcher 20 in the order of the virtual machine VM1, virtual machine VM2, and virtual machine VM3.

With respect to each of the requests REQ from the selected virtual machine VM1, the processing corresponding to the requests REQ is sequentially executed by the control of the dispatcher 20 in the order of the request REQ having the priority level PRIV, the request REQ having the priority level HIGH, the request REQ having the priority level NORM, and the request REQ having the priority level LOW.

For example, the request REQ-LOW of the virtual machine VM1 having the lowest priority level is preferentially executed over the request REQ-PRIV of the virtual machine VM2 having the highest priority level and the request REQ-PRIV of the virtual machine VM3 having the highest priority level.

After the processing of all the requests REQ from those having the highest priority level (PRIV) to those having the lowest priority level (LOW) of the virtual machine VM1 is completed, the processing of all the requests REQ from those having the highest priority level (PRIV) to those having the lowest priority level (LOW) of the virtual machine VM2 is sequentially executed. However, when the group start request GrREQ-S is executed while one or more requests of the virtual machine VM2 are sequentially executed, the processing of the requests REQ from those having the priority level PRIV to those having the priority level LOW of the virtual machine VM2 is suspended. Until the group end request GrREQ-E is executed, the processing of the request REQ held in the queue GrQVM of the group request GrREQ is sequentially executed. After the execution of the group end request GrREQ-E is completed, the processing of the requests REQ from those having the priority level PRIV to those having the priority level LOW of the virtual machine VM2 is resumed.

After all the requests REQ of the virtual machine VM2 are completed, the requests of the virtual machine VM3 are sequentially executed based on the priority and the priority level, in a manner similar to the processing of the requests of the virtual machine VM1 and the virtual machine VM2.

As a result, the virtualization support system of the present embodiment can prevent, for example, interference between the virtual machines and priority inversion.

The input-output processing of the requests may be controlled by a method other than the FIFO method.

(b) Operation Example

An example of an operation (control method) of the system and the virtualization support device of the present embodiment will be described with reference to FIGS. 5 to 14.

Figure 5:
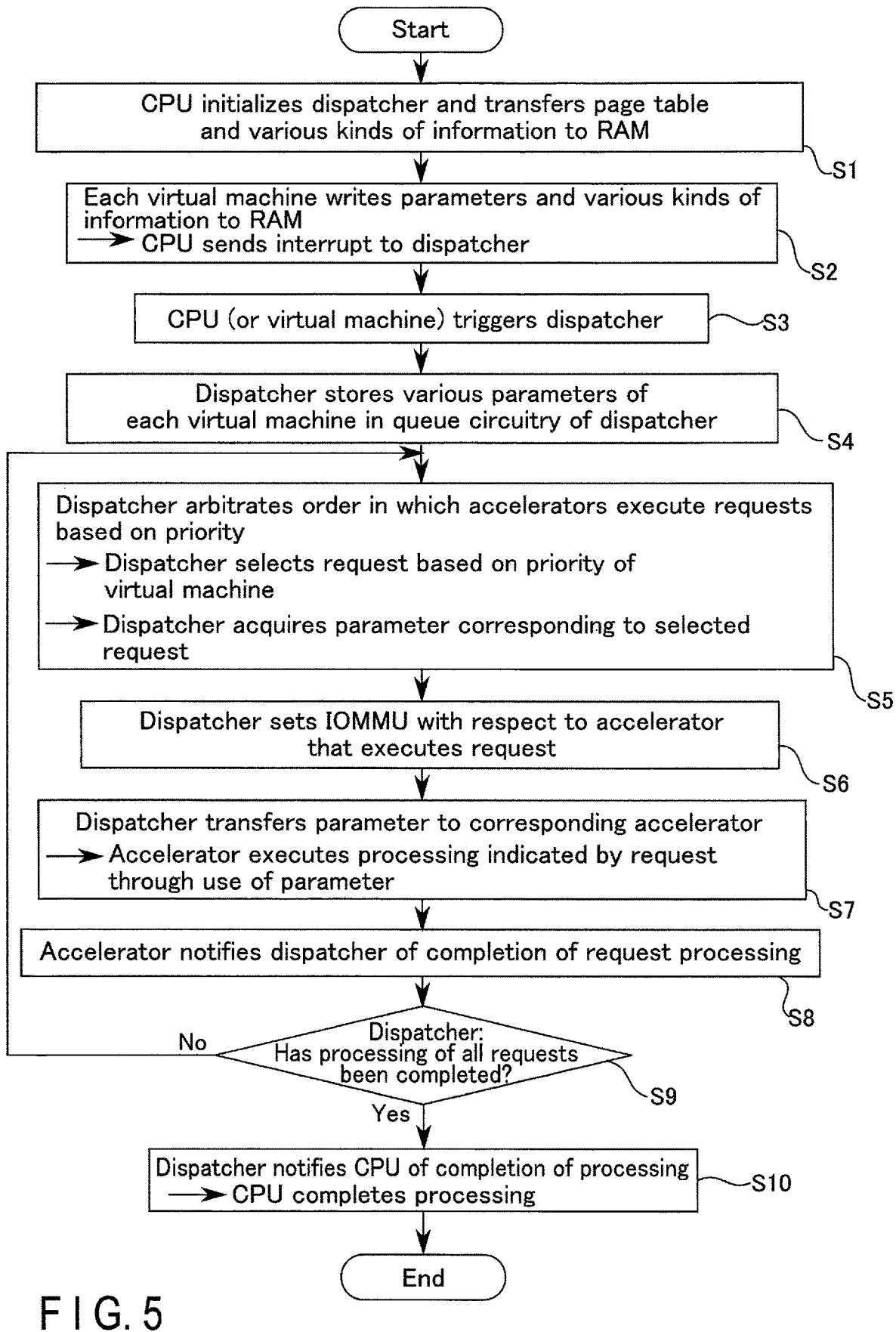
FIG. 5 is a flowchart illustrating an example of an operation of the virtualization support device of the first embodiment.

FIG. 5 is a flowchart illustrating the example of the operation of the system and the virtualization support device of the present embodiment. FIGS. 6 to 14 are schematic diagrams for illustrating the example of the operation of the system and the virtualization support device of the present embodiment.

<Step S1>

As illustrated in step S1 in FIG. 5, in the image recognition system SYS, the CPU 10 (hypervisor 100) initializes the dispatcher 20 when the image processing device 1 is activated.

As illustrated in FIG. 6, when the dispatcher 20 is initialized, the CPU 10 transfers, to the RAM 11, various kinds of information of each virtual machine VM (application APP) such as the page table PT and several pointers (e.g., a pointer to the queue).

For example, with respect to each of the virtual machines VM, the page table PT is written to the page table area 111 of the RAM 11.

<Step S2>

Figure 7:
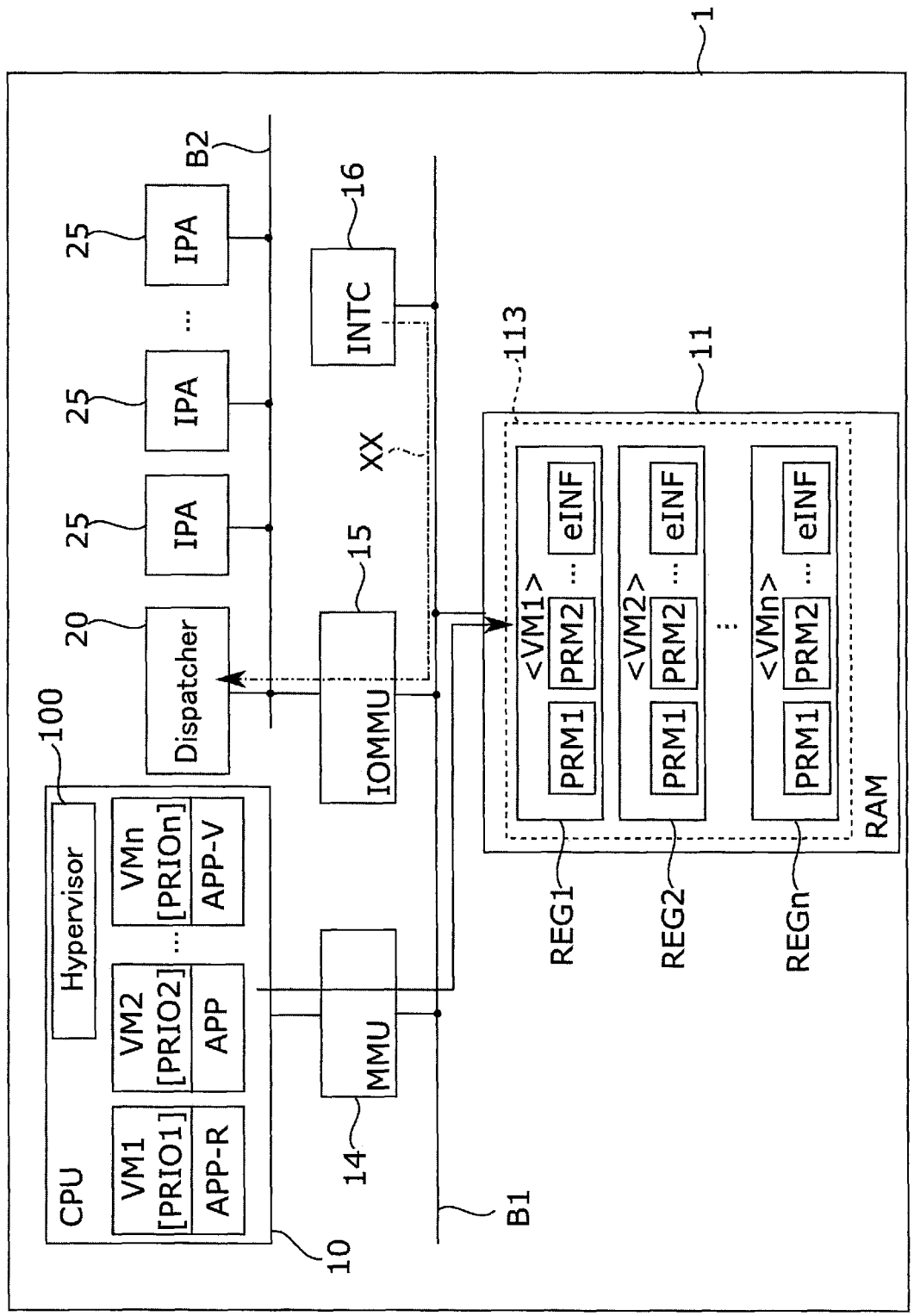

As illustrated in step S2 in FIG. 5 and also illustrated in FIG. 7, the drivers DRV of the respective virtual machines VM write the IPA parameter PRM1, queue parameter PRM2, and error handling information eINF to the corresponding register units RU of the dispatcher register area 113 of the RAM 11.

The CPU 10 sends an interrupt XX to the dispatcher 20 using the interrupt controller 16.

<Step S3>

As illustrated in step S3 in FIG. 5 and also illustrated in FIG. 8, a virtual machine VM triggers a boot program of the dispatcher 20 using the programs of the applications APP (or drivers DRV). Thereby, the dispatcher 20 is booted.

<Step S4>

As illustrated in step S4 in FIG. 5, the dispatcher 20 reads various parameters PRM1, PRM2 in the dispatcher register area 113. The dispatcher 20 stores the read parameters PRM1, PRM2 in the queue circuit 250 and/or the register circuit 202 of the dispatcher 20.

Figure 9:
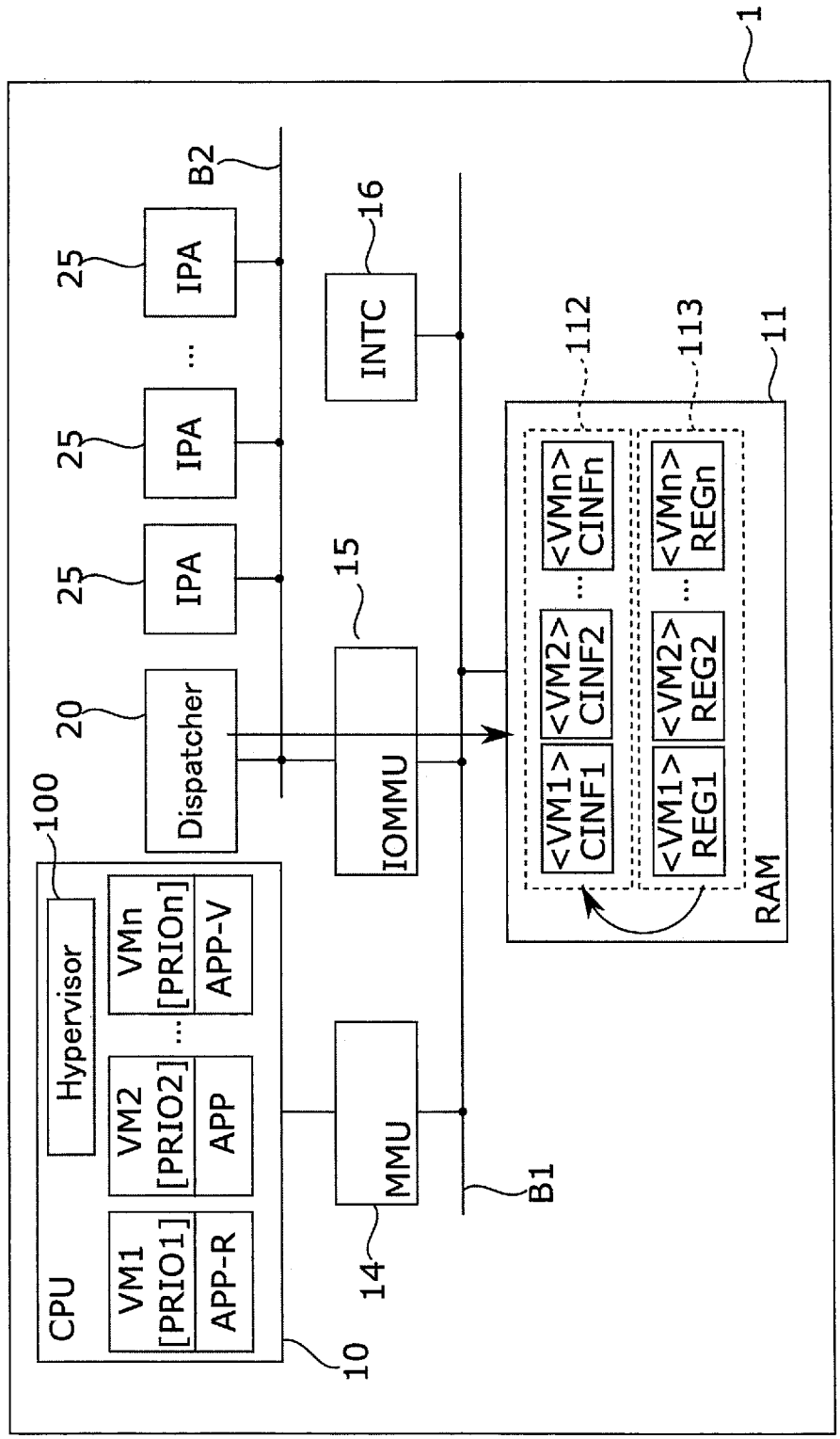

For example, as illustrated in FIG. 9, the read parameters PRM1, PRM2 are written to the control information area 112 that includes the queue circuit 250.

Thereby, the dispatcher 20 acquires the parameters PRM of the respective virtual machines VM.

<Step S5>

The dispatcher 20 arbitrates the order of the execution of the IPA 25 for the plurality of requests REQ from the plurality of applications APP.

As illustrated in step S5 in FIG. 5, the dispatcher 20 checks a queue pointer of the dispatcher 20 based on the priority PRIO set in the respective virtual machines VM (applications).

Based on the result of checking the priority PRIO and the queue pointer, the dispatcher 20 selects the request REQ to be processed. In accordance with the selected request REQ, a virtual machine VM to be operated (application APP to be executed) is recognized and selected. The dispatcher 20 controls the IPA 25 corresponding to the processing of the requests REQ.

As described above, the request REQ-PRIV having the highest priority level that should be executed by the virtual machine VM having the highest priority PRIO is selected from among the plurality of requests REQ.

Figure 10:
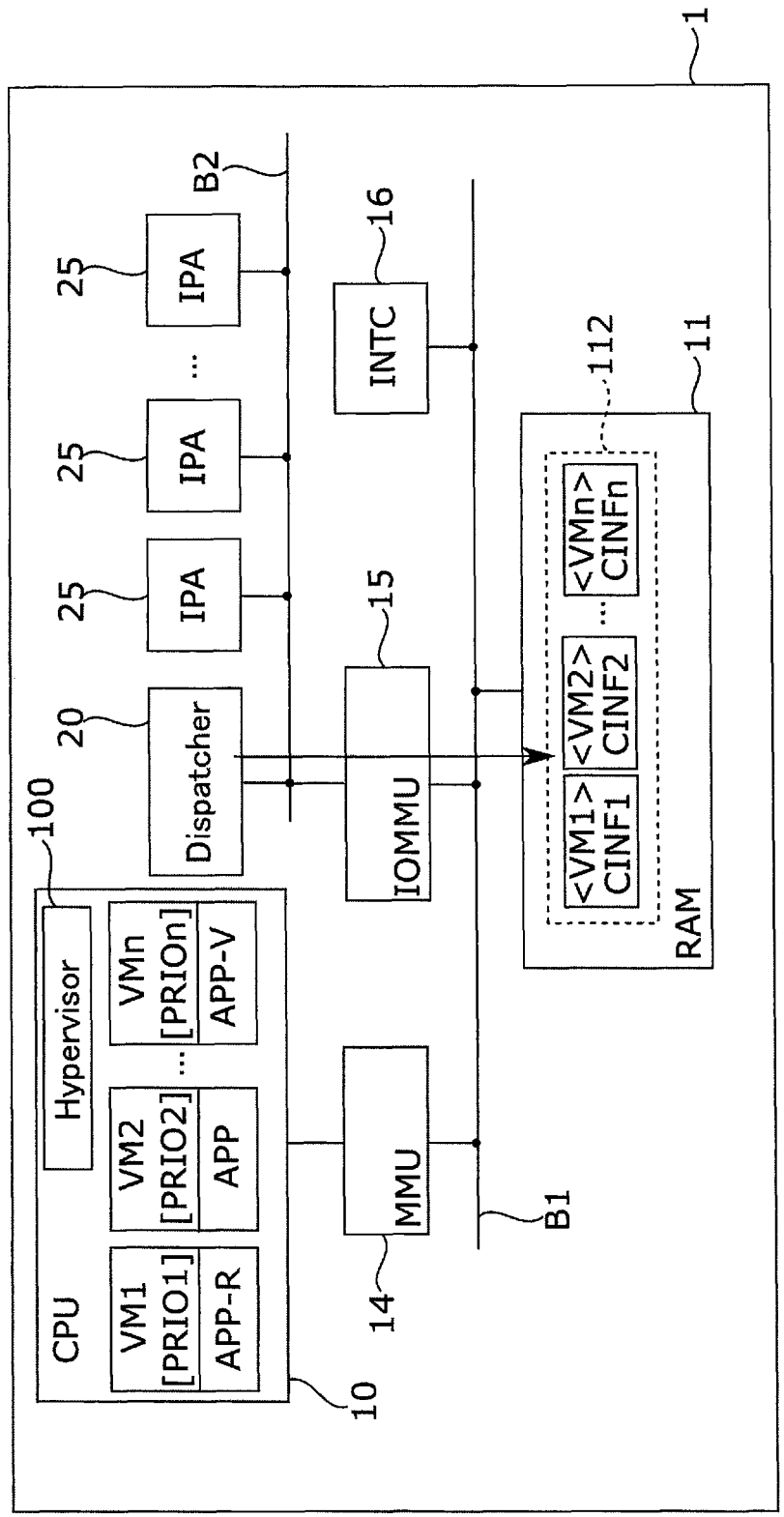

As illustrated in FIG. 10, the dispatcher 20 acquires the parameter PRM corresponding to the selected request REQ from the dispatcher control information area 112 (or dispatcher register area 113).

For example, the dispatcher 20 arbitrates the order of executing the plurality of requests REQ at the IPA 25, so that the processing requested by the recognition application APP-R is prioritized over the processing requested by the view application APP-V.

In the virtualization support device of the present embodiment, the dispatcher 20 arbitrates, without the aid of the CPU 10, the order of execution of the processing REQ requested by the applications APP at the plurality of IPA 25 based on the priority set to the virtual machines VM (applications APP) and the priority level set to the requests (processing) REQ.

<Step S6>

Figure 11:
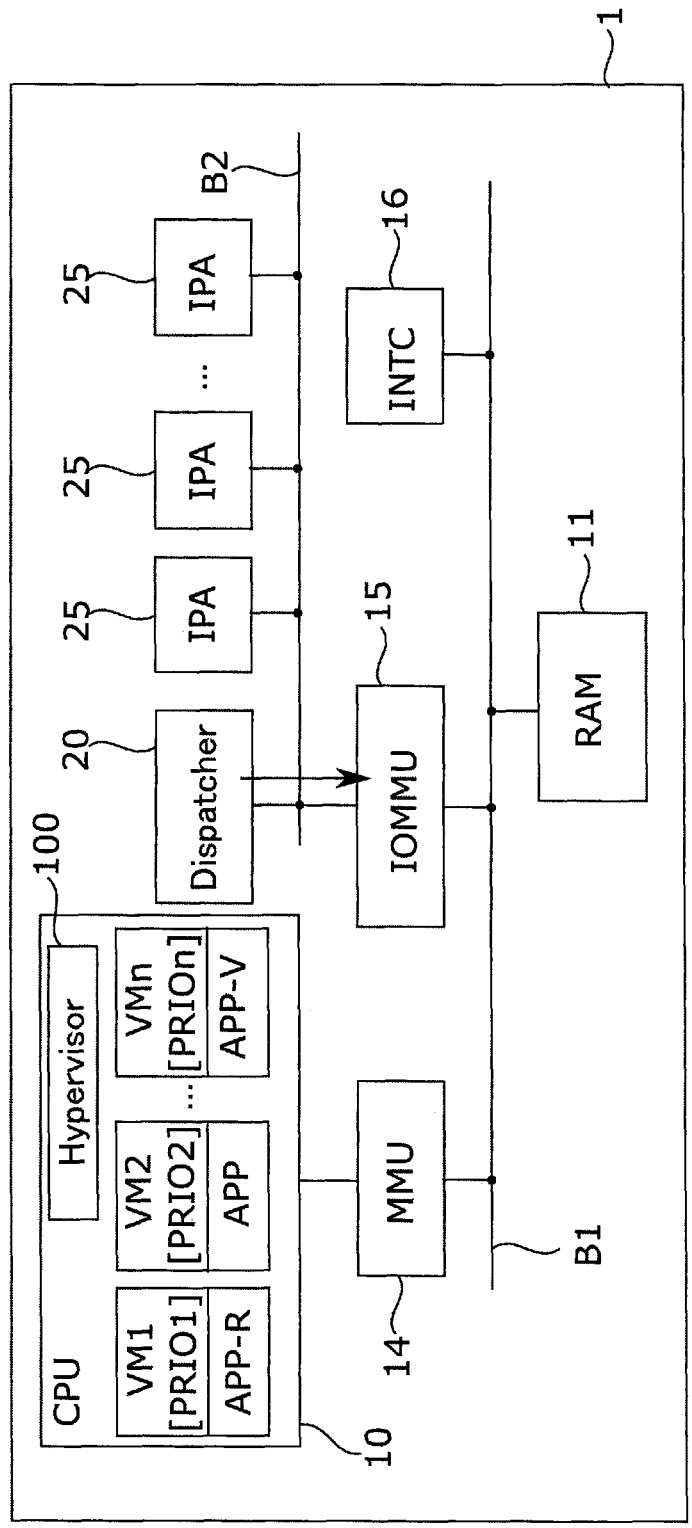

As illustrated in step S6 in FIG. 5 and also illustrated in FIG. 11, the dispatcher 20 controls setting of the IOMMU 15 with respect to the IPA 25 that executes the selected request REQ. For example, the dispatcher 20 executes various types of control so that data can be transferred between the IPA 25 and the RAM 11 (or between the IPA 25 and the CPU 10) based on the information and the parameters in the RAM 11 according to the virtual machine VM selected to be operated in accordance with the result of the arbitration.

<Step S7>

Figure 12:
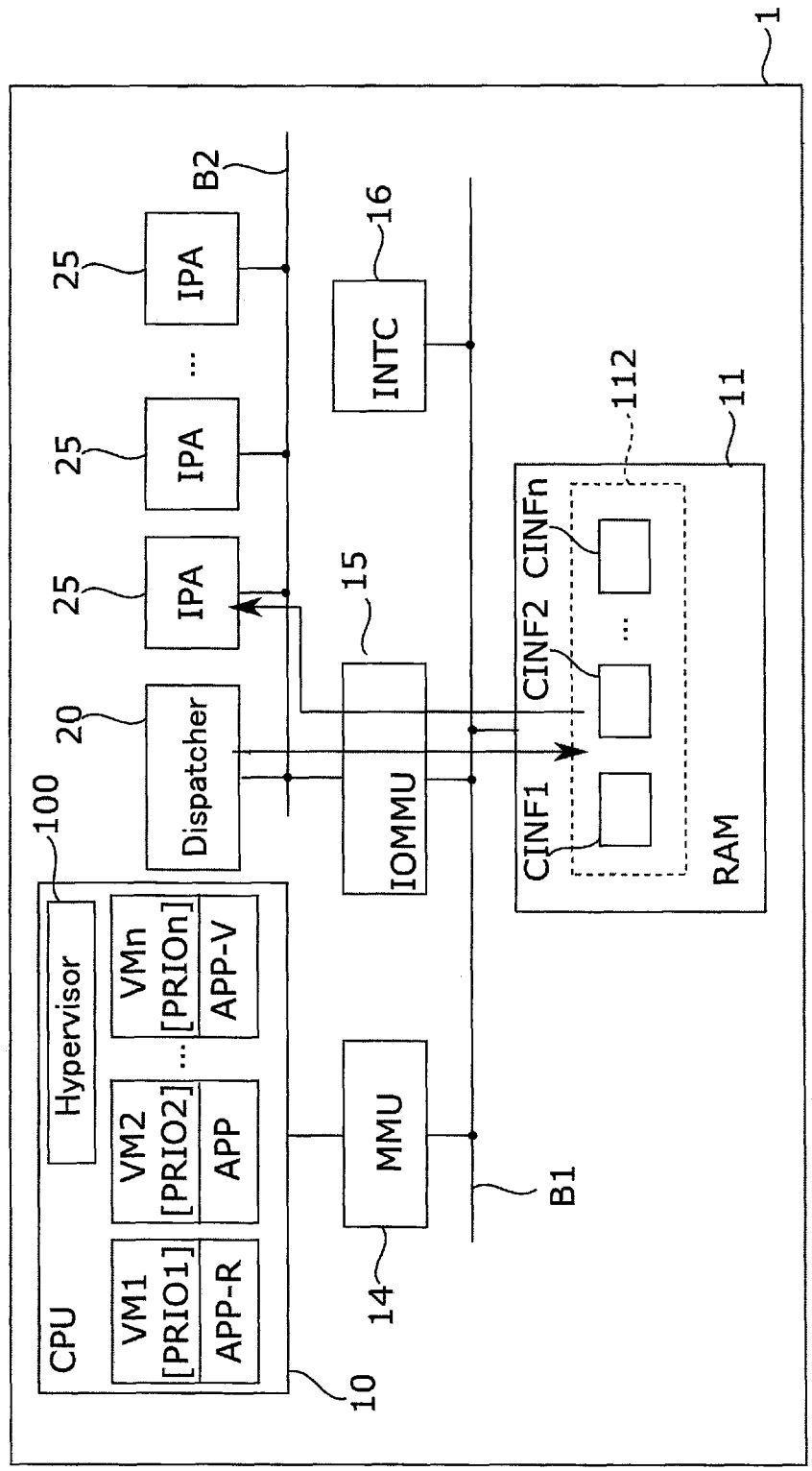

As illustrated in step S7 in FIG. 5 and also illustrated in FIG. 12, the dispatcher 20 transfers the parameter PRM1 related to the request (processing) REQ to be executed to its corresponding IPA 25 from the register unit RU of the virtual machine VM corresponding to the selected request REQ.

Thereby, the corresponding IPA 25 starts the processing indicated by the request REQ. The IPA 25 executes the processing indicated by the request REQ by using the transferred parameter PRM1.

<Step S8>

As illustrated in step S8 in FIG. 5, the IPA 25 completes predetermined processing corresponding to the request REQ. The IPA 25 notifies the dispatcher 20 of the completion of the processing. For example, the IPA 25 sends, to the dispatcher 20, a signal ACK1 for notifying the dispatcher 20 of the completion of the processing, as illustrated in FIG. 13.

<Step S9>

As illustrated in step S9 in FIG. 5, when the dispatcher 20 receives a notification of the completion of the processing (e.g., signal ACK1) from the IPA 25, the dispatcher 20 determines whether or not all the requests REQ in the queue circuit 250 have been completed.

If the dispatcher 20 determines that the processing of all the requests REQ has not been completed (in the case of "No" in step S9), the dispatcher 20 executes the above-described processing of steps S5 to S8 again.

In step S5, the dispatcher 20 selects a request REQ having a priority level that is equal to or less than the priority level of the completed request REQ, as described with reference to FIG. 4 above. In a manner similar to the examples of steps S6 to S8, the dispatcher 20 causes the IPA 25 corresponding to the selected request REQ to execute the desired processing. Thereby, the result of the processing corresponding to the request is obtained with respect to the selected virtual machine VM.

The dispatcher 20 repeats the processing from steps S5 to S8 until no more processing of the requests REQ in the queue circuit 250 be executed.

<Step S10>

Figure 14:
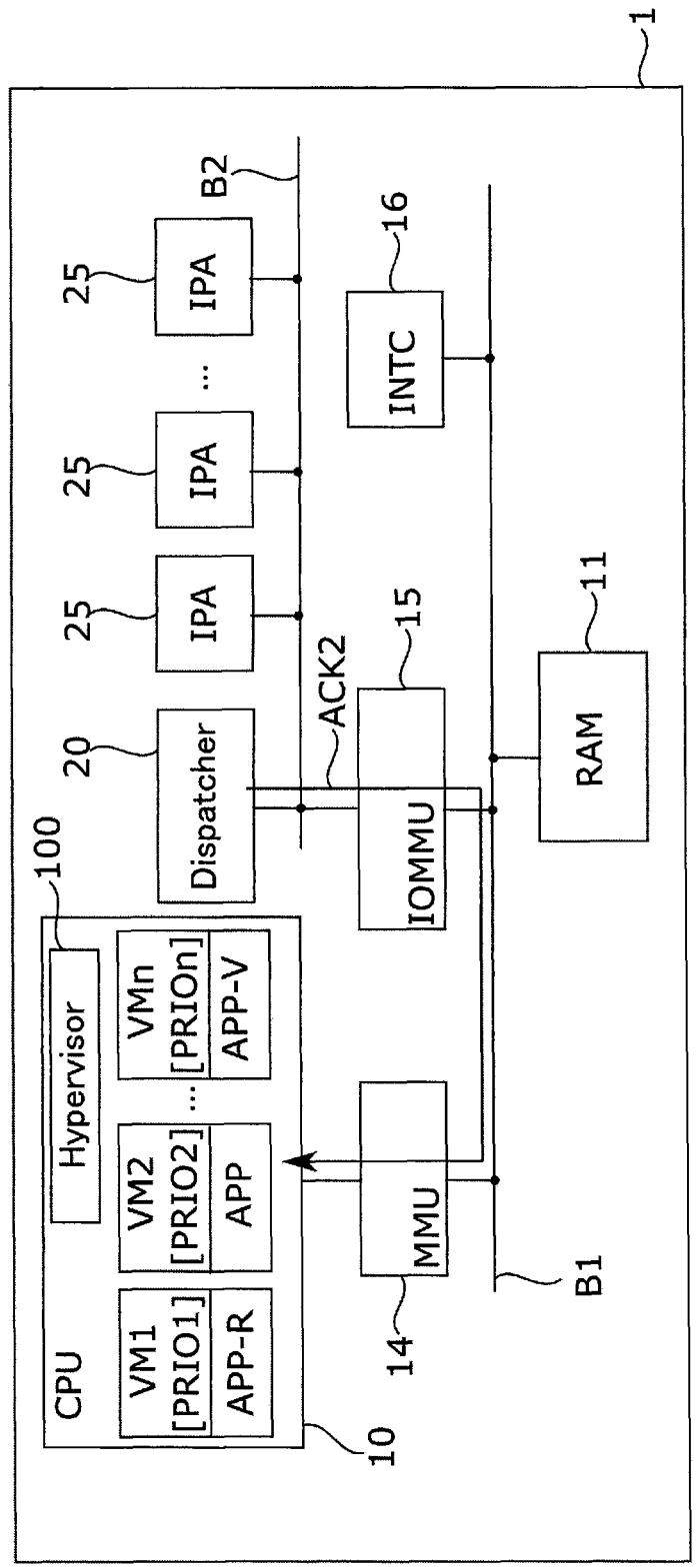

If the dispatcher 20 determines that the processing of all the requests REQ has been completed (in the case of "Yes" in step S9), the dispatcher 20 notifies the CPU 10 of the completion of the processing, as illustrated in step S10 in FIG. 5. For example, the dispatcher 20 sends, to the CPU 10, a signal ACK2 for notifying the CPU 10 of the completion of the processing, as illustrated in FIG. 14.

The CPU 10 receives a notification of the completion of the processing (signal ACK2) from the dispatcher 20. Thereby, the CPU 10 completes the processing of all the requests REQ.

For example, the result of the processing of the virtual machine VM-R corresponding to the recognition application APP-R by the image processing device 1 is displayed, for example, on the display device 9 by the control of the virtual machine VM-V corresponding to the view application APP-V.

Through the process described above, the processing of the virtualization support device 20 of the image processing device 1 is completed.

In the present embodiment, the dispatcher 20 arbitrates the multiple pieces of processing requested by the plurality of virtual machines VM (i.e., requests REQ) based on the priority of the virtual machines VM without the aid of the CPU 10 (hypervisor 100), as described with reference to FIGS. 5 to 14. Based on the result of the arbitration, the dispatcher 20 causes the corresponding IPA 25 to execute the requested processing. Thereby, the virtual machine VM can execute desired processing.

(c) Summary

In general, context switching occurs in a processor in a device/system configured to be able to execute a plurality of applications in parallel by using a virtual machine. The load associated with control of the context switching is imposed on the processor.

The virtualization support device of the present embodiment is provided in the device/system together with the processor.

The virtualization support device of the present embodiment arbitrates, in place of the processor (CPU), the order in which the IPA 25 executes the multiple pieces of processing requested by the applications (virtual machines).

Thereby, the virtualization support device of the present embodiment can reduce the load on the processor.

In the present embodiment, the configuration (circuitry) for arbitrating the plurality of requests from the plurality of applications executed in parallel is mounted in the device/system as hardware, such as the dispatcher 20, separated from the processor. Thereby, the implementation of the hypervisor is simplified.

As a result, the image processing device (e.g., system LSI) and the image recognition system that include the virtualization support device of the present embodiment can improve the quality of the hypervisor and reduce the implementation costs.

Accordingly, the virtualization support device (image processing device or image recognition system) of the present embodiment can improve the usability of the processor.

(2) Second Embodiment

A virtualization support device of a second embodiment will be described with reference to FIGS. 15 to 20.

(a) Configuration Example

Figure 15:
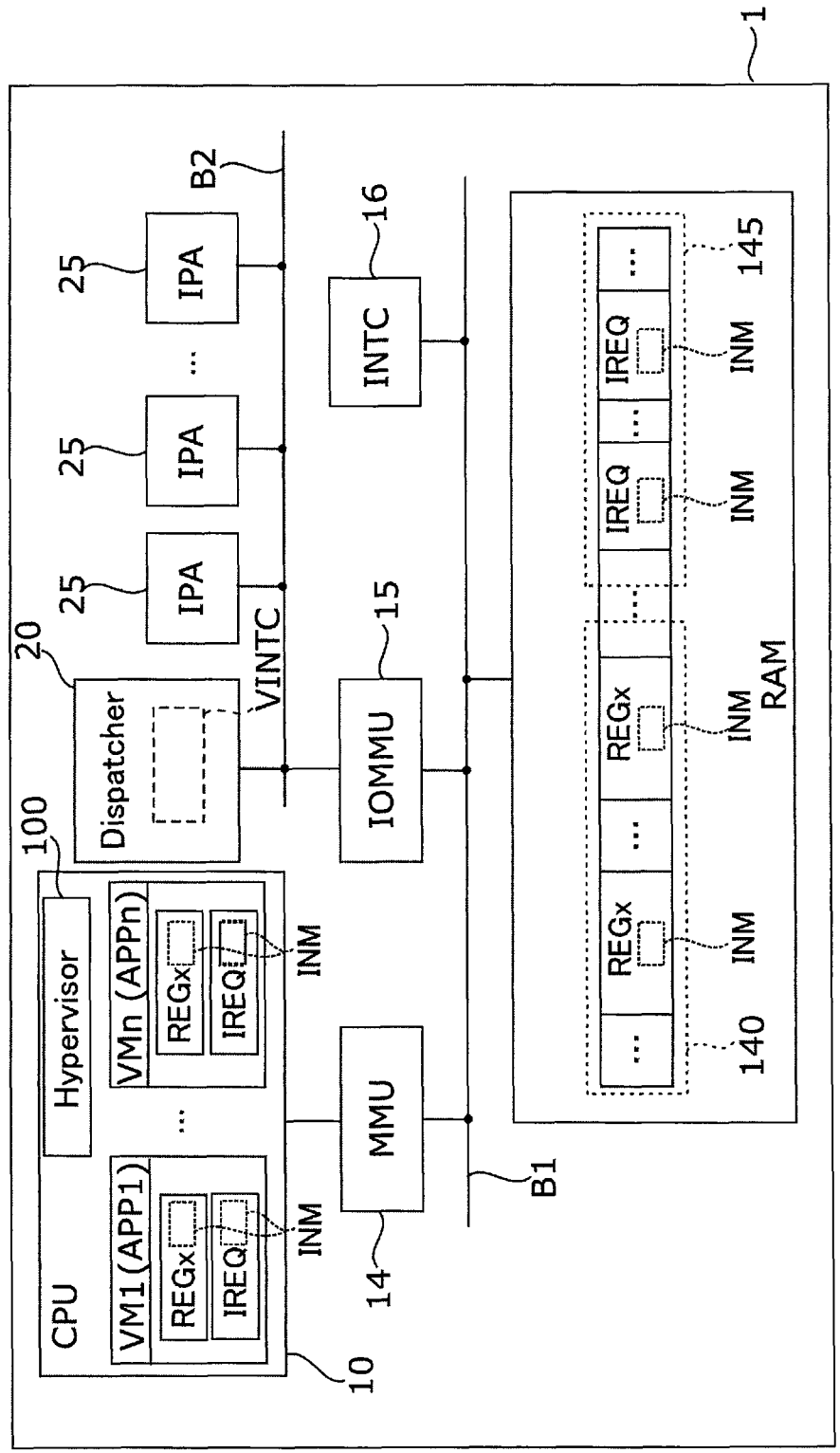
FIG. 15 is a schematic diagram showing an example of a configuration of a virtualization support device of a second embodiment.

FIG. 15 is a schematic diagram for illustrating the virtualization support device of the present embodiment.

The dispatcher 20 may be virtualized in the MMU 14 for an area of communication between the virtual machine VM (CPU 10) and the dispatcher 20.

For example, the dispatcher 20 and the virtual machine VM can communicate with each other via the memory area (also referred to as a "data storage area") reserved in the RAM 11.

Thereby, communication from the virtual machines to the dispatcher in steps S2 to S4 in FIG. 5 and communication (and interrupt processing) from the dispatcher 20 to the CPU (processor) 10 in step S10 in FIG. 5 can be executed.

For example, with respect to the dispatcher 20, a register (hereinafter referred to as a "virtual register" or a "virtual register area") 140 and an interrupt controller (hereinafter referred to as a "virtual interrupt controller" or a "virtual interrupt controller module") VINTC are virtualized, as illustrated in FIG. 15.

For example, the virtual register 140 is provided in the RAM 11. The virtual register 140 may be provided in the dispatcher register area 113 of the RAM 11, or in a memory area other than the area 113. The dispatcher register area 113 may be regarded as the virtual register 140.

Register information (also referred to as "interrupt information") RGx is stored in the virtual register 140. The register information RGx includes the above-described IPA parameter PRM1, queue parameter PRM2, and the like. For example, the register information RGx is written to the virtual register 140 by the virtual machine VM.

For example, the dispatcher 20 includes a program or circuitry for implementing the function of the interrupt controller as the virtual interrupt controller VINTC.

The virtual interrupt controller VINTC can control the interrupt processing of a virtual machine VM among the plurality of virtual machines.

A virtual machine VM issues a request (hereinafter also referred to as an "interrupt request") REQx when the virtual machine VM requests certain processing while processing of another virtual machine VM is executed.

The virtual machine VM writes the request REQx to an area where the request REQx is to be stored (hereinafter referred to as an "interrupt request area" or a "interrupt queue") 145. The interrupt request area 145 is provided in the RAM 11.

The interrupt request area 145 and the virtual register 140 may be combined to form one area in the RAM 11. The interrupt request area 145 and the virtual register 140 may be provided in the dispatcher register area 113.

For example, the dispatcher 20 stores the parameters PRM1 and PRM2 of the request REQx related to the corresponding virtual machine VM in the queue circuit 250 of the dispatcher 20 based on the interrupt request REQx by the control of the virtual interrupt controller VINTC.

The virtual machine VM and the virtual interrupt controller VINTC (dispatcher 20) can access the virtual register 140 and the interrupt request area 145 in the RAM 11 through the MMU 14.

Figure 16:
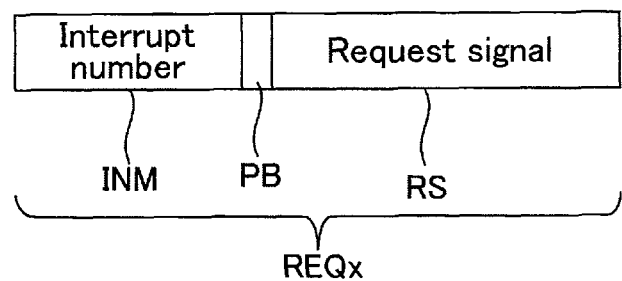
FIG. 16 is a schematic diagram for illustrating an example of a configuration of the virtualization support device of the second embodiment.

FIG. 16 schematically shows a configuration of the request according to the present embodiment.

As shown in FIG. 16, the request (interrupt request) REQx includes a request signal IRS and an interrupt number INM. The request signal IRS includes a signal indicating the processing to be executed and a signal related to control of the processing to be executed. The interrupt number INM is a unique number (e.g., an identification number of the virtual machine) set by the virtual machine VM.

Also, the request REQx (REQ) includes a status bit SB. The status bit SB indicates various types of information on the request.

Based on the interrupt number INM, the dispatcher 20 can determine which virtual machine VM has issued a request REQx.

For example, the register information RGx is arranged in the virtual register 140 in the order of arrangement corresponding to the interrupt number INM (identification number of the virtual machine). Therefore, the dispatcher 20 can acquire register information RGx corresponding to the interrupt number INM of a request REQx from the virtual register 140 based on the arrangement (address) in the virtual register 140 of the register information RGx.

The interrupt request REQx may be arranged in the interrupt request area 145 based on the order of arrangement corresponding to the identification number of the virtual machine. In this case, the interrupt request REQx need not include an interrupt number. The dispatcher 20 acquires a request for interrupt processing based on the status bit indicating presence or absence of interruption of the request REQx. Based on the order of arrangement of the acquired request REQ, the dispatcher 20 acquires the register information RGx in the corresponding order of arrangement.

The MMU 14 can transform the virtual address and the physical address with respect to the virtual register 140 and the interrupt request area 145. Thereby, the virtual machine VM (CPU 10) can access the address of the corresponding register information RGx in the RAM 11.

In the present embodiment, since the dispatcher 20 is not associated with a specific virtual machine VM, the dispatcher 20 processes the requests from all the virtual machines VM. Therefore, it is desired that the dispatcher 20 access the register 140 and the interrupt request area 145 corresponding to all the virtual machines VM. However, said areas 140 and 145 are not virtualized by the IOMMU.

In the present embodiment, the dispatcher 20 calculates an address of the REQx corresponding to the virtual machine as a source of the request by using the interrupt number INM, and accesses the virtual register 140 and the interrupt request area 145.

(b) Operation Example

An example of an operation of the virtualization support device of the present embodiment will be described with reference to FIGS. 17 to 20.

FIG. 17 is a flowchart for illustrating the example of the operation of the virtualization support device (image processing device or image recognition system) of the present embodiment.

FIGS. 18 to 20 are schematic diagrams for illustrating the example of the operation of the virtualization support device of the present embodiment.

<Step S21>

As illustrated in step S21 in FIG. 17, a virtual machine (the virtual machine VM1 in this example) among the plurality of virtual machines VM generates a request REQx1.

As shown in FIG. 18, the virtual machine VM1 writes register information RGx1 regarding the request REQx1 to the virtual register 140 of the RAM 11 through the MMU 14. For example, the register information RGx1 is arranged in the address corresponding to the identification number of the virtual machine in the virtual register 140.

As shown in FIG. 19, the virtual machine VM1 writes the request (e.g., interrupt request) REQx1 to the interrupt request area 145 of the RAM 11 through the MMU 14. An interrupt number INM1 is given to the interrupt request REQx1 by the virtual machine VM1.

For example, another virtual machine (the virtual machine VM2 in this example) sends a request REQx2 different from the request REQx1 from the virtual machine VM1, as shown in FIG. 20.

In this case, the virtual machine VM2 writes register information RGx2 and a request REQx2 in the virtual register 140 and the interrupt request area 145, respectively. The request REQx2 has an interrupt number INM2.

<Steps S22 and S23>

As illustrated in step S22 in FIG. 17 and also illustrated in FIG. 20, the dispatcher 20 refers to the interrupt request REQx in the interrupt request area 145 in the RAM 11 through the virtual interrupt controller VINTC. For example, the dispatcher 20 can select an interrupt request REQx (e.g., request REQx1) corresponding to the virtual machine VM based on the interrupt number INM.

As illustrated in step S23 in FIG. 17, the dispatcher 20 acquires register information RGx (the register information RGx1 in this example) having the order of arrangement corresponding to the interrupt number (identification number of the virtual machine) INM1 from the virtual register 140 through the virtual interrupt controller VINTC, based on the interrupt number INM1 of the selected request REQx1. For example, the dispatcher 20 sends the acquired information RGx to the queue circuit 250.

In this manner, in the present embodiment, the dispatcher 20 can communicate with each of the virtual machines VM via the RAM 11.

<Step S24>

As illustrated in step S24 in FIG. 17, the dispatcher 20 stores the acquired parameter information in the queue circuit 250 of the dispatcher 20.

<Step S25>

As illustrated in step S25 in FIG. 17, the dispatcher (virtual interrupt controller VINTC) determines whether or not the processing of all the requests (e.g., interrupt requests) has been completed.

If the processing of all the requests has not been completed (in the case of "No" in step S25), the dispatcher 20 repeatedly executes the processing of steps S22 to S25.

If the processing of all the requests has been completed (in the case of "Yes" in step S25), the dispatcher 20 completes reception of the request REQx of each virtual machine VM.

In the present embodiment, the dispatcher 20 and the virtual machines VM are not associated with each other. The dispatcher 20 can read the parameter corresponding to the request REQx from the RAM based on the number given to the request REQx (or the order of arrangement in the request area 145) without using the CPU 10 or IOMMU 15, and store the parameter in the queue circuit.

In this manner, in the present embodiment, the dispatcher 20 can store the parameter for processing the request REQx in the queue circuit of the dispatcher 20 based on the request REQx stored in the RAM 11.

Accordingly, the virtualization support device (image processing device or image recognition device) of the present embodiment can achieve the same effects as those achieved in the first embodiment.

(3) Third Embodiment

A virtualization support device of a third embodiment will be described with reference to FIG. 21.

FIG. 21 is a schematic diagram for illustrating the virtualization support device of the present embodiment.

As shown in FIG. 21, in the device 1, an error occurs in the processing of the IPA 25, or the IOMMU 15 detects violation of protection (e.g., violation related to an area of use of the memory).

In the present embodiment, when the IPA 25 reports an error during execution of the processing, or when the IOMMU 15 detects violation of protection, the dispatcher 20 detects the error/protection violation, and executes various types of processing for the error/protection violation.

For example, the dispatcher 20 includes error handling circuit 209.

The error handling circuit 209 can detect error/protection violation. With respect to the detected error/protection violation, the error handling circuit 209 performs error handling such as specifying an error interrupt, clearing the error interrupt, recording the error, resetting the error of the IPA, and selecting and setting the next request. The function of the error handling circuit 209 may be implemented by software (a program) stored in the dispatcher 20.

The error handling circuit 209 performs the error handling by using the above-described error handling information eINF. The error handling information eINF is written to the register unit RU of the corresponding virtual machine VM in the dispatcher register area 113 of the RAM 11 by, for example, the corresponding virtual machine VM (or CPU 10). The error handling information eINF may be stored in the dispatcher control information area 112.

The error handling circuit 209 may perform the error handling based on a notification of the error from the IPA 25 or a notification of the violation of protection from the IOMMU 15.

At the time of detecting the error/protection violation, the error handling circuit 209 of the dispatcher 20 reads, from the RAM 11, the error handling information eINF of the virtual machine VM related to the request REQ for which the error/protection violation has occurred. The error handling circuit 209 receives the read error handling information eINF.

The error handling circuit 209 performs the error handling indicated by the error handling information eINF based on the priority of the virtual machine VM corresponding to the IPA 25 in which the error/protection violation has occurred and the priority (hereinafter also referred to as "urgency") of the error/protection violation.

The priority of the virtual machine VM and the urgency of the error/protection violation are set statically or at the time of initializing the image processing device (or image recognition system), for example.

When both the priority of the virtual machine VM and the urgency of the error/protection violation are high, the error handling circuit 209, for example, instantly performs interrupt processing to the CPU 10 as error handling.

When either one of the priority of the virtual machine VM or the urgency of the error/protection violation is low, the error handling circuit 209, for example, retains the status of the processing as error handling.

Thereby, in the present embodiment, the error of the processing (request) and violation of protection are resolved.

In general, if the virtual machine performs error handling, delay of processing occurs in the virtual machine that performs the error handling. The delay in the virtual machine that has performed the error handling has a negative influence on the processing of another virtual machine (such as delay of the processing).

Also, if the CPU performs error handling, the load on the CPU is increased.

In contrast, the dispatcher 20 (error handling circuit 209) performing the error handling, as in the present embodiment, can suppress the delay of the processing of the virtual machine VM and the load on the CPU 10.

Accordingly, the virtualization support device (image processing device or image recognition device) of the present embodiment can achieve the same effects as those achieved in the first embodiment.

(4) Others

In the present embodiment, the example of applying the virtualization support device of the present embodiment to an image processing device (image recognition system) is shown. However, the device of the present embodiment may be applied to devices other than the image processing device as long as said devices execute a plurality of applications in parallel.

The virtualization support device, image processing device, or image recognition system of the present embodiment may be applied to personal computers, smartphones, futuristic phones, mobile terminals, game machines, servers, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A virtualization support device comprising:
a first processor configured to control an operation of a plurality of hardware accelerators;
a memory configured to hold first information regarding a first application executed by a second processor, second information regarding a second application executed by the second processor, third information, fourth information, one or more first requests from the first application, and one or more second requests from the second application; and
an input/output memory management unit coupled to the first processor and the memory,
wherein the first processor is configured to:
perform arbitration of an order in which the plurality of hardware accelerators execute the first and second requests from the first and second applications;
control setting of the input/output memory management unit by using one of the first and second information based on the arbitration;
cause one or more of the plurality of hardware accelerators to execute one of the first and second requests based on the arbitration;
receive at least one of a notification of an error from a hardware accelerator in which the error has occurred and a notification of violation of protection from the input/output memory management unit; and
perform the error handling by using one of the third and fourth information based on the arbitration, the third information indicating error handling of the first application with respect to at least one of an error of the plurality of hardware accelerators and violation of protection detected by the input/output memory management unit, and the fourth information indicating error handling of the second application with respect to at least one of the error and the violation of protection.

2. The virtualization support device of claim 1, wherein the first processor is configured to communicate with the second processor via the memory.

3. The virtualization support device of claim 1, wherein:
the first application has a first priority, and the second application has a second priority lower than the first priority;
the first processor is configured to cause one or more of the plurality of hardware accelerators to execute the first requests based on the arbitration that is performed using the first and second priorities; and
the first processor is configured to cause one or more of the plurality of hardware accelerators to execute the second requests after completion of the first requests.

4. The virtualization support device of claim 1, wherein:
the first information includes at least one of a first page table, first parameter information, and first queue information, the first page table showing a relationship between a first physical address and a first virtual address of a first memory space used for the first application, the first parameter information relating to data to be subjected to processing of the first application, and the first queue information relating to a queue that holds the one or more first requests; and
the second information includes at least one of a second page table, second parameter information, and second queue information, the second page table showing a relationship between a second physical address and a second virtual address of a second memory space used for the second application, the second parameter information relating to data to be subjected to processing of the second application, and the second queue information relating to a queue that holds the one or more second requests.

5. The virtualization support device of claim 1, wherein the second processor includes a first virtual machine for executing the first application and a second virtual machine for executing the second application.

6. The virtualization support device of claim 1, wherein:
the second processor is configured to perform calculation processing on image data by using the first application and one or more of the plurality of hardware accelerators; and
the second processor is configured to perform processing related to displaying of a result of the calculation processing by using the second application and one or more of the plurality of hardware accelerators.

7. A control method of a virtualization support device, the method comprising:
performing, by a first processor, arbitration of an order in which a plurality of hardware accelerators execute one or more first requests from a first application and one or more second requests from a second application, the one or more first requests and the one or more second requests having been executed by a second processor;
referring, by the first processor, to first information related to the first application and second information related to the second application, the first information and the second information being stored in a memory;
controlling, by the first processor, setting of an input/output memory management unit between the plurality of hardware accelerators and the memory by using one of the first and second information based on the arbitration;
causing, by the first processor, one or more of the plurality of hardware accelerators to execute one of the first and second requests based on the arbitration;
receiving by the first processor, at least one of a notification of an error from a hardware accelerator in which the error has occurred, or a notification of violation of protection from the input/output memory management unit; and
performing, by the first processor, the error handling by using one of third information and fourth information based on the arbitration, the third and the fourth information being stored in the memory, the third information indicating error handling of the first application with respect to at least one of an error of the plurality of hardware accelerators and violation of protection detected by the input/output memory management unit, the fourth information indicating error handling of the second application with respect to at least one of the error and the violation of protection.

8. The control method of the virtualization support device of claim 7, wherein the first processor is configured to communicate with the second processor via the memory.

9. The control method of the virtualization support device of claim 7, wherein:
the first application has a first priority, and the second application has a second priority lower than the first priority;
the first processor is configured to cause one or more of the plurality of hardware accelerators to execute the first requests based on the arbitration that is performed using the first and second priorities; and
the first processor is configured to cause one or more of the plurality of hardware accelerators to execute the second requests after completion of the first request.

10. The control method of the virtualization support device of claim 7, wherein:
the second processor is configured to perform calculation processing on image data by using the first application and one or more of the plurality of hardware accelerators; and
the second processor is configured to perform processing related to displaying of a result of the calculation processing by using the second application and one or more of the plurality of hardware accelerators.

11. The control method of the virtualization support device of claim 7, wherein:
the first information includes at least one of a first page table, first parameter information, and first queue information, the first page table showing a relationship between a first physical address and a first virtual address of a first memory space used for the first application, the first parameter information relating to data to be subjected to processing of the first application, and the first queue information relating to a queue that holds the one or more first requests; and
the second information includes at least one of a second page table, second parameter information, and second queue information, the second page table showing a relationship between a second physical address and a second virtual address of a second memory space used for the second application, the second parameter information relating to data to be subjected to processing of the second application, and the second queue information relating to a queue that holds the one or more second requests.

12. The control method of the virtualization support device of claim 7, wherein the second processor includes a first virtual machine for executing the first application and a second virtual machine for executing the second application.

13. A calculation system comprising:
a first processor including a first virtual machine for executing a first application and a second virtual machine for executing a second application;
a plurality of hardware accelerators configured to each execute a calculation processing based on one or more first requests from the first application and one or more second requests from the second application;
a virtualization support device including a second processor, a memory, and an input/output memory management unit, the second processor configured to control operations of the plurality of hardware accelerators, the memory configured to hold first information related to the first application, second information related to the second application, third information indicating error handling of the first application with respect to at least one of an error of the plurality of hardware accelerators and violation of protection detected by the input/output memory management unit, fourth information indicating error handling of the second application with respect to at least one of the error and the violation of protection, the one or more first requests, and the one or more second requests, the input/output memory management unit configured to manage communication between the second processor and the memory, wherein the second processor is configured to:
perform arbitration of an order in which the plurality of hardware accelerators execute the first and second requests from the first and second applications;
control setting of the input/output memory management unit by using one of the first and second information based on the arbitration;
cause one or more of the plurality of hardware accelerators to execute one of the first and second requests based on the arbitration;
receive at least one of a notification of an error from a hardware accelerator in which the error has occurred and a notification of violation of protection from the input/output memory management unit; and
perform the error handling by using one of the third and fourth information based on the arbitration.

14. The calculation system of claim 13, wherein the second processor is configured to communicate with the first processor via the memory.

15. The calculation system of claim 13, wherein:
the first application has a first priority, and the second application has a second priority lower than the first priority;
the second processor is configured to cause one or more of the plurality of hardware accelerators to execute the first requests based on the arbitration that is performed using the first and second priorities; and
the second processor is configured to cause one or more of the plurality of hardware accelerators to execute the second requests after completion of the first requests.

16. The calculation system of claim 13, wherein:
the first information includes at least one of a first page table, first parameter information, and first queue information, the first page table showing a relationship between a first physical address and a first virtual address of a first memory space used for the first application, the first parameter information relating to data to be subjected to processing of the first application, and the first queue information relating to a queue that holds the one or more first requests; and
the second information includes at least one of a second page table, second parameter information, and second queue information, the second page table showing a relationship between a second physical address and a second virtual address of a second memory space used for the second application, the second parameter information relating to data to be subjected to processing of the second application, and the second queue information relating to a queue that holds the one or more second requests.

17. The calculation system of claim 13, wherein:
the first processor is configured to perform calculation processing on image data by using the first application and one or more of the plurality of hardware accelerators; and
the first processor is configured to perform processing related to displaying of a result of the calculation processing by using the second application and one or more of the plurality of hardware accelerators.

* * * * *